United States Patent [19]
Oku et al.

[11] Patent Number: 5,880,786
[45] Date of Patent: Mar. 9, 1999

[54] APPARATUS FOR PICTURE DECODING HAVING FRAME MEMORIES COMMONLY CONNECTED TO ONE DATA BUS AND ONE ADDRESS BUS

[75] Inventors: Masuo Oku, Kamakura; Yukitoshi Tsuboi; Yukio Fujii, both of Yokohama; Hiroyuki Mizosoe, Kawasaki, all of Japan

[73] Assignee: Hitachi, Ltd., Tokyo, Japan

[21] Appl. No.: 490,237

[22] Filed: Jun. 14, 1995

[30] Foreign Application Priority Data

| Jun. 15, 1994 | [JP] | Japan | 6-133058 |
| Jul. 1, 1994 | [JP] | Japan | 6-150792 |
| Jul. 7, 1994 | [JP] | Japan | 6-155695 |

[51] Int. Cl.$^6$ ........................................ H04N 7/32
[52] U.S. Cl. ............................... 348/415; 348/715
[58] Field of Search ........................ 348/384, 390, 348/400–402, 409–413, 415, 416, 446, 699, 700, 714–718; 382/232, 236, 238; H04N 7/130, 7/137

[56] References Cited

U.S. PATENT DOCUMENTS

| 5,247,363 | 9/1993 | Sun et al. ............... | 348/700 |
| 5,353,119 | 10/1994 | Dorricott et al. ......... | 348/446 |
| 5,386,234 | 1/1995 | Veltman et al. .......... | 348/409 |
| 5,453,799 | 9/1995 | Yang et al. .............. | 348/699 |
| 5,457,675 | 10/1995 | Suzuki et al. ............ | 348/699 |
| 5,534,928 | 7/1996 | Iwamura ................. | 348/416 |
| 5,543,847 | 8/1996 | Kato ..................... | 348/415 |

OTHER PUBLICATIONS

The Journal of the Institute of Televison Engineers of Japan, vol. 48, No. 1, pp. 44 to 49, "MPEG2 / H.262" (No Translation).

IEICE, Spring Conference, C–659, 1994, pp. 5–227 (No Transaction).

ISSCC94 (1994 Internaional Solid–State Circuits Conference), Session 4, Video and Communication Signal Processors, Paper WP4.4. pp. 56–57 & 72–73.

Primary Examiner—Richard Lee
Attorney, Agent, or Firm—Antonelli, Terry, Stout & Kraus, LLP

[57] ABSTRACT

An apparatus for picture decoding includes a decoder unit for obtaining decoded picture data by decoding coded data of a video signal coded by at least one of intra-frame coding (I frame), inter-frame coding (P frame), and frame-interpolation coding (B frame); a memory unit including a first frame memory, a second frame memory, and a third frame memory commonly connected to one data bus and one address bus; a display unit for reading the decoded picture data stored in the memory unit in field units based on a display synchronization signal and obtaining interlace-scanned display picture data; and a time control unit for reading the decoded picture data from the first frame memory and the second frame memory as reference frames for the B frame, and for controlling a time difference between a time of writing decoded picture data in the third frame memory, and a time of reading decoded picture data for display by the display unit, from the third frame memory, for reading decoded picture data before rewriting the same addresses, thereby attaining simultaneous read and write of the third frame memory at frame units.

16 Claims, 19 Drawing Sheets

APPARATUS FOR PICTURE DECODING HAVING FRAME MEMORIES COMMONLY CONNECTED TO ONE DATA BUS AND ONE ADDRESS BUS

BACKGROUND OF THE INVENTION

The present invention relates to an apparatus for picture decoding for decoding and/or decompressing coded and/or compressed picture signals and more particularly to an apparatus for picture decoding which is effective in reducing the memory capacity, the memory data bus width, the decoding delay time, and the decoding clock frequency.

An international standard of picture compression which is referred to as MPEG2 is being decided for the purpose of application to digital broadcasting and recording media (for example, the journal of the institute of television engineers of Japan, Vol. 48, No. 1, pp 44 to 49). In the MPEG2 coding system, picture signals are coded by combining an intra-frame coding frame (hereinafter called an I frame), an inter-frame coding frame (hereinafter called a P frame), and a frame-interpolation coding frame (hereinafter called a B frame) properly so as to enable coexistence of the high data compression rate and the random access and edit functions with each other.

In the I frame, only picture data in the frame is compressed by transform coding. This is a system using that there is a correlation between picture data in the frame, which divides the frame into blocks of the predetermined size, transforms each block, quantizes the coefficient data after conversion equivalent to the frequency component, and further generates coded data by variable length coding.

In the P frame, the data compression rate is increased by using a high correlation between the frames. The previous frame and the current frame are compared in the predetermined number of blocks, and a motion vector is obtained, and the picture data of the previous frame is read from the position shifted according to the motion vector, and a predicted value is obtained. Thereafter, the predicted value is subtracted from the picture data of the current frame to be coded, and this motion compensated prediction error is transform-coded in the same way as with the intra-frame coding system, and coded data is generated.

To increase the data compression rate more, the B frame is used. Frame-interpolation coding is also called bidirectional motion compensation inter-frame coding and uses the correlation not only with the previous frame but also with the subsequent frame. This system compares the previous frame in the order of display with the current frame in the predetermined number of blocks, obtains a motion vector, obtains a motion vector also for the subsequent frame in the order of display in the predetermined number of blocks at the same time, reads the picture data of the previous frame and the subsequent frame from the position shifted according to the respective motion vectors, generates a mean value, and obtains a frame-interpolation value. Thereafter, the system subtracts the frame-interpolation value from the picture data of the current frame to be coded and obtains a motion compensated prediction error.

For example, the system executes intra-frame coding for the first frame (I frame), executes inter-frame coding for the fourth frame using the first frame as a reference picture (P frame), and then executes frame-interpolation coding for the second and third frames using the first and fourth frames as a reference picture (B frame). In this case, the frame display order is the first>the second>the third>the fourth. However, the coding order is changed to the first>the fourth>the second>the third and the B frame will not be a reference picture for subsequent coding.

A television video signal is an interlace-scanned signal, so that a frame is structured from two fields in which the number of lines is a half and the line position is shifted alternately. There is also a time lag between the fields constituting a frame. On the other hand, for coding, picture data of two fields are merged and then divided and coded into blocks of the predetermined size as picture data of a frame. In an apparatus for picture decoding, pictures are decoded in the coding order, so that decoded results are obtained in the sequential scanning order in block units directing from the upper left to the lower right in the frame. However, in an apparatus for picture decoding, it is necessary to output an interlace-scanned video signal.

Therefore, in an apparatus for picture decoding, it is necessary to convert between sequential scanning in block units and interlace scanning in pixel units. When the B frame is included, it is necessary to reorder the frames so as to reorder to the normal display order.

A conventional apparatus for picture decoding is described in, for example, the 1994 IEICE (Institute of Electronics, Information and Communication Engineers) Spring Conference, C-659 (Proceeding 5, p. 227) or ISSCC94 (1994 IEEE International Solid-State Circuits Conference)/Session 4/Video and Communication Signal Processors/Paper WP4.4. The conventional apparatus for picture decoding consists of a buffering step of writing coded data to be inputted in the coded data buffer once by the input clock, a decoding step of reading and decoding the coded data from the coded data buffer in the predetermined timing and by the decoding clock and writing the decoded picture data in a frame memory having a capacity of several frames once, and a display step of reading the decoded picture data from the frame memory by executing scanning conversion and frame reordering and displaying and outputting it as a digital video signal according to the predetermined display clock. Furthermore, when the decoding data is P frame data or B frame data, the decoding step reads the reference picture data on the reference picture from the frame memory so as to execute motion compensation.

The input clock is a transmission clock itself for digital broadcasting. The display clock relates to the sampling frequency of a digital video signal and is set to a standard value of 13.5 MHz or 27 MHz. The decoding clock is set to a frequency at which the decoding of coded data of each frame can be finished always within the one-frame period even in consideration of variations in the processing amount necessary for decoding coded data of each frame. The processing amount required for decoding coded data of each frame generally varies according to the coding system by which the frame is coded, that is, the I frame, the P frame, or the B frame. The processing amount also varies according to the amount of coded data of the frame. The decoding clock may be set independently of the input clock or the display clock and may be set to a frequency at the predetermined ratio to the display clock. In either case, the decoding step and the display step are performed independently and asynchronously with each other. Furthermore, buffering step of coded data is also necessary and this operation is asynchronous with the memory access operation of the decoding step or the display step. Therefore, an arbitration function for arbitrating the memory access right is essential. It is generally necessary to stop the decoding step during the arbitration period and it is necessary to set the decoding clock slightly higher beforehand so as to process coded data of one frame during the one-frame period excluding the arbitration period.

A conventional apparatus for picture decoding is an apparatus corresponding to a current TV set of the 525/60 system used in USA and Japan, and picture data of one frame consists of data of a luminance signal and two kinds of chrominance signals, and the luminance signal consists of 720 horizontal pixels and 480 vertical lines, and the two kinds of chrominance signals consist of 360 pixels and 240 lines in which the resolution is ½ times of that of the luminance signal in both of the horizontal and vertical directions. Furthermore, in a conventional apparatus for picture decoding, four dynamic RAMs of the 256k×16 bits (4M bits) configuration are used and for the total capacity of 16M bits, 2 frames for storing picture data on the reference picture necessary for decoding and 1.5 frames necessary for interlace conversion in the display step, that is, 3.5 frames in total (about 4M bits×3.5=14M bits) can be used as a frame memory area and about 2M remaining bits can be used as a buffering area for coded data. The data bus reads or writes coded data or picture data 64 (16×4) bits in length and 40 MHz is selected as a decoding clock frequency.

SUMMARY OF THE INVENTION

Compared with a conventional apparatus for picture decoding:

(1) An object of the present invention is to execute interlace conversion of decoded picture data of one frame memory and reduce the memory capacity. By doing this, the memory capacity can be reduced to less than 16M bits also for the 625/50 system (a frame =about 4.7M bits) used in Europe where one-frame picture data is larger than that in USA and Japan. Furthermore, the delay caused by decoding can be decreased.

(2) Another object of the present invention is to perform various asynchronous operations without using the memory access right arbitration function. By doing this, the decoding block frequency is lowered. This also produces an effect of reducing the circuit size by decreasing the power consumption and increasing the mergin for circuit operation delay.

(3) Still another object of the invention is to access the memory efficiently and decrease the data bus width of the memory. By doing this, for example, for realizing an LSI (large scale integrated circuit) for an apparatus for picture decoding, the number of pins can be reduced and the number of conductor lines of a printed circuit board can be reduced.

To accomplish the above objects, the present invention includes a decoding means for obtaining decoded picture data by decoding coded data of a data-compressed video signal in block units consisting of a plurality of pixels in the frame, a memory means for writing and storing said decoded picture data, and a display means for reading the decoded picture data stored in said memory means in field units on the basis of a display synchronization signal and obtaining interlace-scanned display picture data and:

(1) The processing for decoding is executed in synchronization with the processing for display and the minimum delay time from start of decoding of coded data of one frame to start of display is 0.5 frames.

(2) The time slot is clocked on the basis of the display synchronization signal and the memory means is accessed by the decoding means and the display means on the basis of the time slot.

(3) The memory means consists of two memory arrays and for access from the decoding means and the display means to the memory means, the two memory arrays are used alternately.

The apparatus has the following operations.

(1) Since the processing for decoding is executed in synchronization with the processing for display and the delay time from start of decoding to start of display is 0.5 frames, the decoded picture data of the frame during decoding is written in the capacity of at least one frame, and reading of the decoded picture data of the previous frame is completed as display picture data before the decoded picture data of the previous frame is lost by rewriting currently decoded picture data, and an interlace-scanned display output is obtained. As a result, with a memory capacity of 3 frames or less including the memory for storing the reference picture data the processing for decoding and the processing for display can be achieved.

(2) The memory is accessed on the basis of the predetermined time slot and even when there is a large variation in the processing amount required to decode the coded data of each frame, coded data of one frame can be decoded always during the one-frame period. No arbitration of memory access right is required between various memory accesses, so that the decoding clock frequency can be lowered and the circuit size can be reduced.

(3) Since the two memory arrays are used alternately, it is possible to read or write data from or into the memory continuously. By doing this, the memory can be accessed efficiently and necessary memory access can be executed even for a small data width.

DESCRIPTION OF THE PREFERRED EMBODIMENTS

The embodiments of the present invention will be explained with reference to the accompanying drawings.

Figure 1:
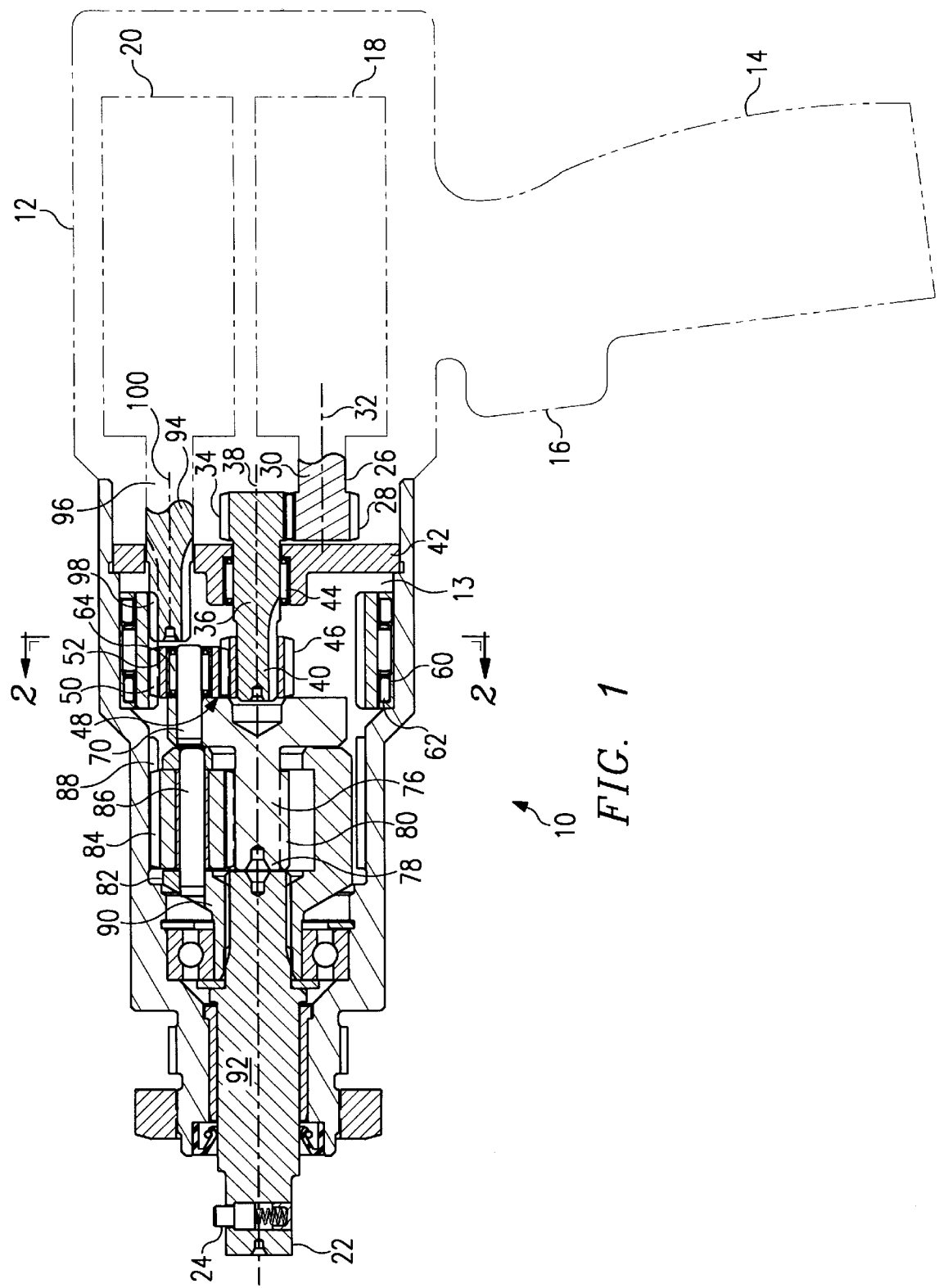
FIG. 1 is a block diagram of an apparatus for picture decoding which is an embodiment of the present invention.

FIG. 1 is a drawing showing an apparatus for picture decoding of the present invention. A numeral 1 indicates a decoding circuit for executing the processing for decoding and the processing for display of coded data and 2 a memory connected to the decoding circuit 1. The decoding circuit 1 consists of an input buffer memory 11, a decoding data buffer memory 12, a variable length decoding unit 13, an IDCT (inverse discrete cosine transform) unit 14, a motion compensation unit 15, a display unit 16, a memory controller 17, and a timing unit 18.

Figure 2:
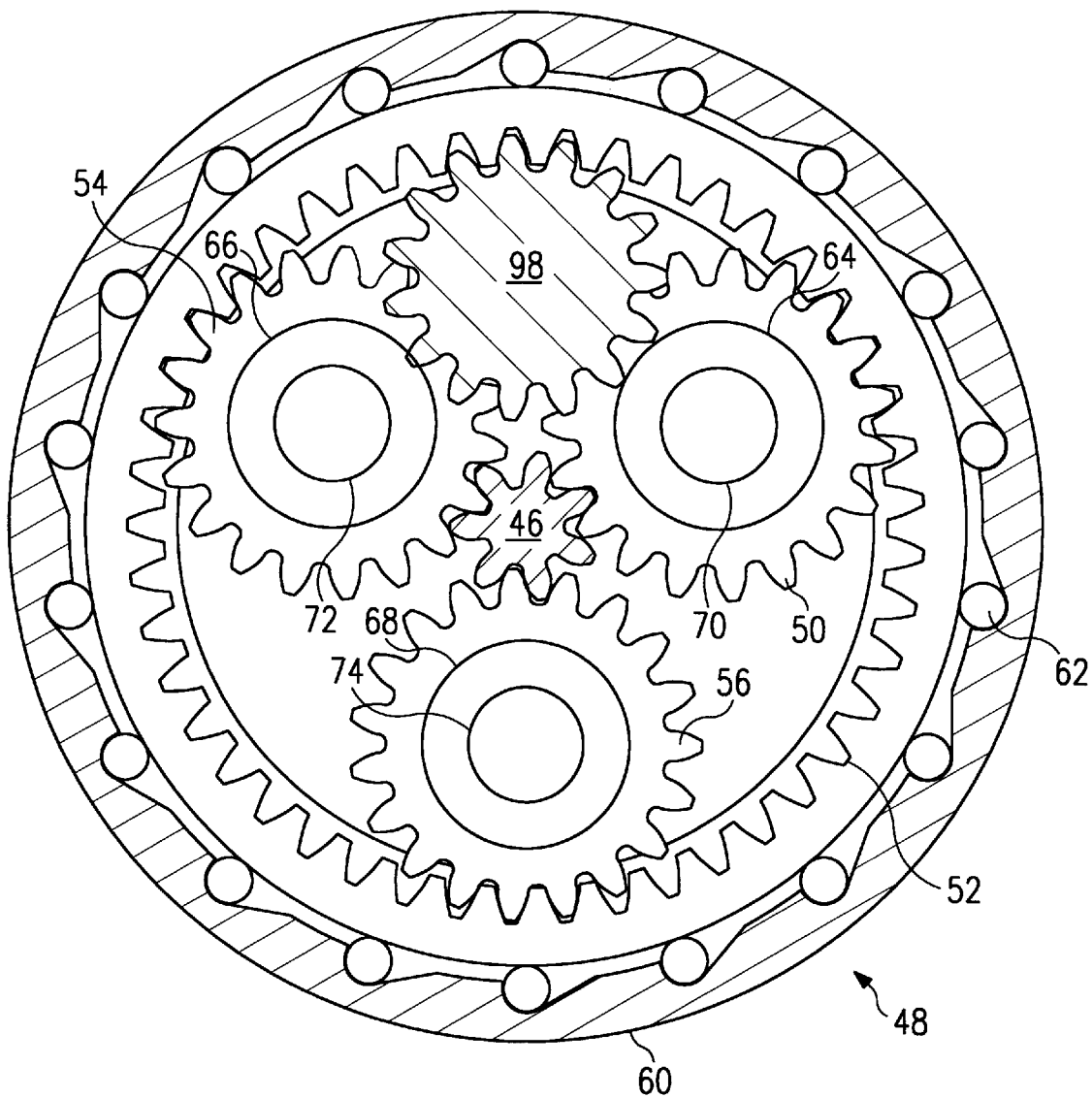
FIG. 2 is a drawing showing an embodiment of division of the memory area.

FIG. 2 shows an area division map of the memory 2. The size of each frame is set up to 4.7M bits in consideration of the TV system in Europe and a capacity of 16M bits is distributed to 3 frames and a buffer for coded data at least 1.8M bits.

In FIG. 1, coded data (compressed picture data) is inputted to the input buffer memory 11 in the decoding circuit 1. Furthermore, the coded data is stored temporarily in the memory 2 from the input buffer memory 11 via the data bus and the memory controller 17. After being temporarily stored, the coded data is read from the memory 2 via the memory controller 17 and stored in the decoding data buffer memory 12.

The coded data is supplied to the variable length decoding unit 13 from the decoding data buffer memory 12 at a request of the variable length decoding unit 13. The variable length decoding unit 13 decodes the coefficient data of the coded data which is obtained by discrete cosine transformation, motion vector information, and coding type information and sends the factor data to the IDCT unit 14, the motion vector information to the motion compensation unit 15, and the coding type information to the display unit 16. The IDCT unit 14 performs inverse discrete cosine transformation for the coefficient data, generates IDCT picture data, and supplies it to the motion compensation unit 15. The motion compensation unit 15 reads reference picture data from the memory 2 on the basis of the motion vector information and generates decoded picture data by adding the IDCT picture data to the reference picture data.

Furthermore, the decoded picture data is stored in the memory 2 via the memory controller 17. Thereafter, the decoded picture data is read at a request of the display unit 16 and outputted from the display unit 16 as display picture data. Decoded picture data of the I frame or the P frame is also used as reference picture data.

Figure 3:
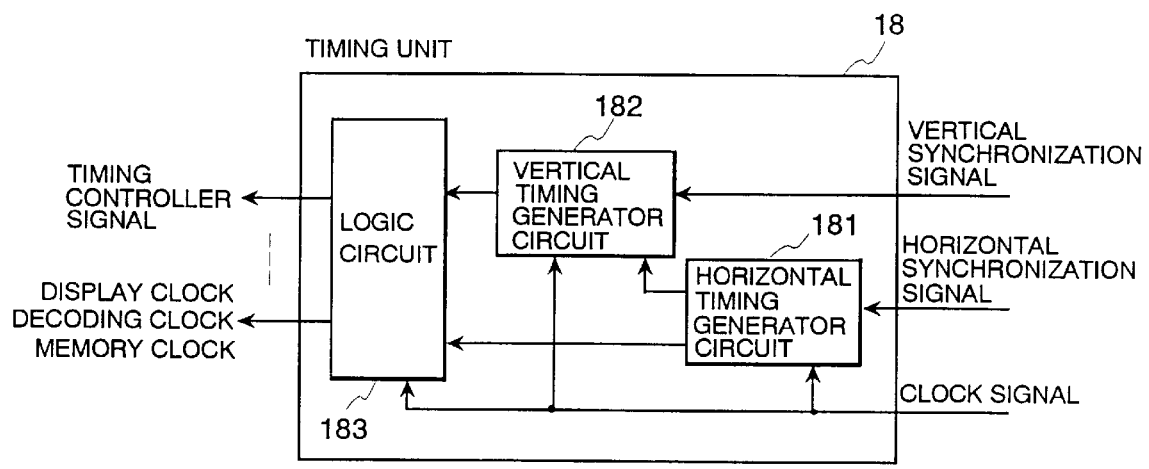
FIG. 3 is a block diagram of the timing unit shown in FIG. 1.

FIG. 3 is a drawing showing the constitution of the essential section of the timing unit 18. As shown in the drawing, the timing unit 18 operates in the external synchronization mode for supplying a horizontal synchronization signal and a vertical synchronization signal of a video signal from the outside. The timing unit 18 may have a synchronization signal generator for generating a horizontal synchronization signal and a vertical synchronization signal inside thereof and operate in the internal synchronization mode in which the synchronization signal generator is triggered in the timing of decoding of the first frame of the coded data and generates a horizontal synchronization signal and a vertical synchronization signal. In the drawing, a numeral 181 indicates a horizontal timing generator circuit, 182 a vertical timing generator circuit, and 183 a logic circuit. The horizontal timing generator circuit 181 is reset by a horizontal synchronization signal and is a horizontal pixel counter for performing a counting operation according to, for example, a clock signal of 13.5 MHz. The horizontal pixel counter repeats a counting operation for the total number of pixels on a line including the horizontal blanking period, that is, for 858 pixels. The vertical timing generator circuit 182 is reset by a vertical synchronization signal and is a vertical line counter for performing a counting operation one by one whenever the horizontal timing generator circuit 181 completes a counting operation of the total number of pixels constituting a line. The vertical line counter performs a counting operation for the total number of lines in a field including the horizontal blanking period, that is, for 263 lines or 262 lines. The vertical line counter performs the counting operation alternately in a form of 262 lines in the first field constituting a frame or 263 lines in the second field.

The logic circuit 183 outputs the input clock of 13.5 MHz as a display clock and also generates and outputs a decoding clock of about 22 MHz by a PLL circuit. The frequency of the decoding clock is selected so that the coded data of one frame can be decoded during the one-frame period regardless of the coding type and the decoding clock becomes a clock signal which is a basis for the timing of processing for decoding in the decoding data buffer memory 12, the variable length decoding unit 13, the IDCT unit 14, and the motion compensation unit 15. The frequency of the display clock is equal to the sampling frequency of a luminance signal and the display clock is a clock signal which is a basis for the timing of processing for display in the display unit 16. Furthermore, a clock signal two or three times of the decoded clock is supplied to the memory controller 17 as a memory clock. When the memory clock is two times of the decoded clock, the data bus width in the decoding circuit 1 is set to two times of the data bus width in the memory 2 and when the memory clock is three times, the data bus width in the decoding circuit 1 is set to three times, so that the data speed which is supplied to the memory controller 17 via the data bus in the decoding circuit 1 and the data speed accessing from the memory controller 17 to the memory 2 are made equal to each other. In the following explanation, the memory clock is three times of the decoded clock.

Furthermore, the logic circuit 183 generates and outputs various timing control signals from a horizontal pixel count value generated by the horizontal timing generator circuit 181 and a vertical line count value generated by the vertical timing generator circuit 182 and synchronizes the processing for display and the processing for decoding with each other.

Figure 4:
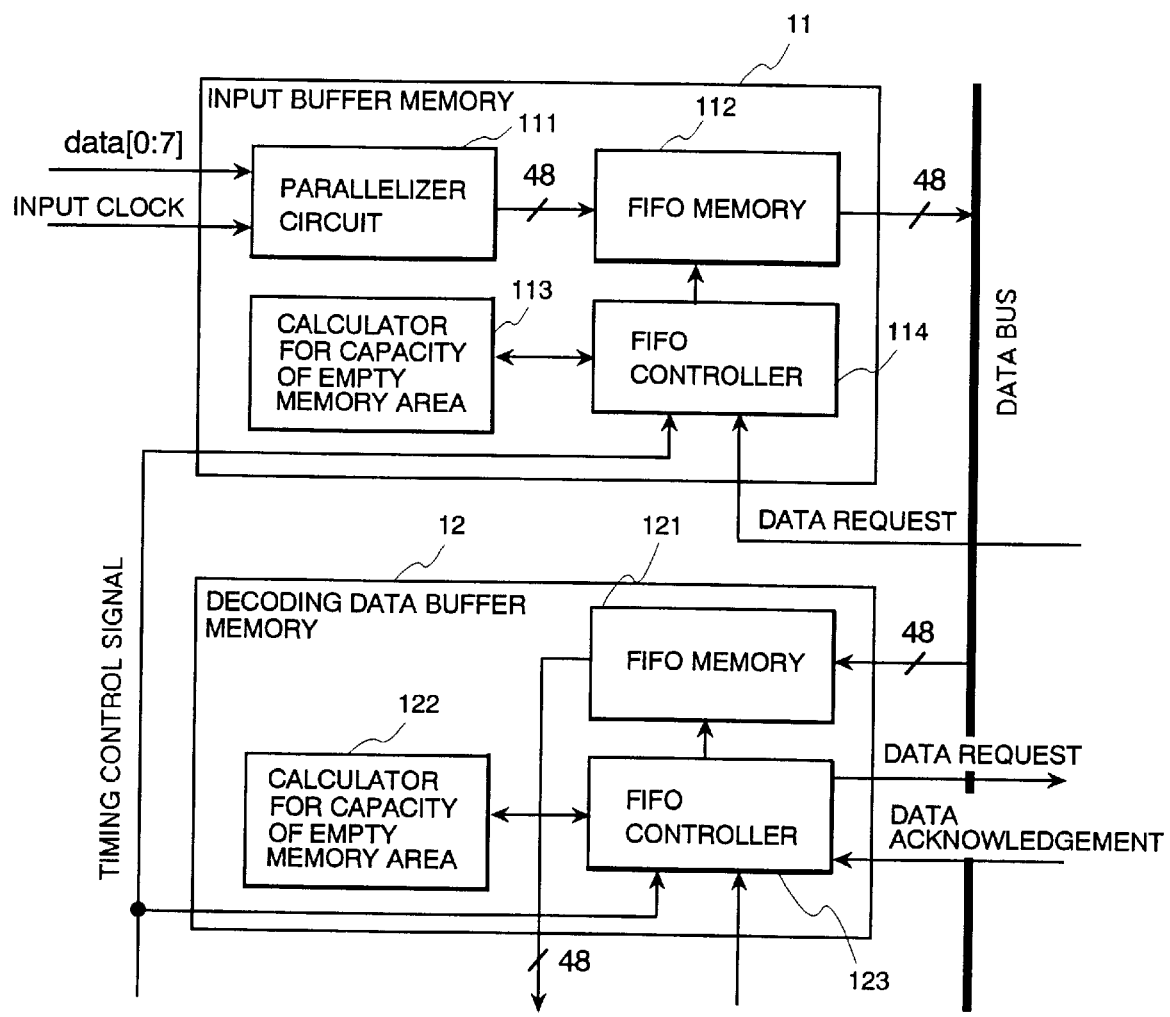
FIG. 4 is a block diagram of the input buffer memory and the decoding data buffer memory shown in FIG. 1.

FIG. 4 is a drawing showing a constitution of the input buffer memory 11 and the decoding data buffer memory 12 shown in FIG. 1. In the input buffer memory 11, a numeral 111 indicates a parallelizer circuit, 112 an FIFO memory, 113 a calculator for capacity of empty memory area, and 114 an FIFO controller. In the decoding data buffer memory 12, a numeral 121 indicates an FIFO memory, 122 a calculator for capacity of empty memory area, and 123 an FIFO controller.

The input buffer memory 11 has a role of mediating coded data from the input unit to the memory 2. Coded data has a configuration of, for example, 8 bits and is inputted to the parallelizer circuit 111 of the input buffer memory 11 according to an input clock. The parallelizer circuit 111 parallelizes the above inputted data with 48-bit data (the bus width of the memory 2 is set at 16 bits) having the same data width as that of the data bus and inputs it to the FIFO memory 112. The FIFO memory 112 is a well-known first-in first-out memory and is controlled by the FIFO controller 114. The control of the FIFO controller 114 is based on the result when the capacity of empty memory area of the FIFO memory 112 is calculated by the calculator for capacity of empty memory area 113 and a data request signal. Namely, when the data request signal indicates a data permission status and the calculation result of the calculator for capacity of empty memory area 113 indicates that the predetermined number of data is stored in the FIFO memory 112, the coded data is read from the FIFO memory 112 onto the data bus. The reading clock is a decoding clock and the asynchronization of the input clock and the decoding clock is released by the FIFO memory.

The decoding data buffer memory 12 mediates the coded data with a 48-bit width from the memory 2 to the variable length decoding unit 13 equivalent to the first stage of the picture decoding processing shown in FIG. 1 via the FIFO memory 12. The FIFO memory 121 is controlled by the FIFO controller 123. Namely, to supply data to the FIFO memory 121, the calculator for capacity of empty memory area 122 calculates the empty area of the FIFO memory 121, outputs a data request signal to the memory controller 17 when there exists an empty area in the FIFO memory 121, receives a data acknowledge signal outputted from the memory controller 17, and writes the predetermined number of coded data read from the memory 2 in the FIFO memory 121. Furthermore, the FIFO memory 121 outputs coded data at a request of the variable length decoding unit 13.

Figure 5:
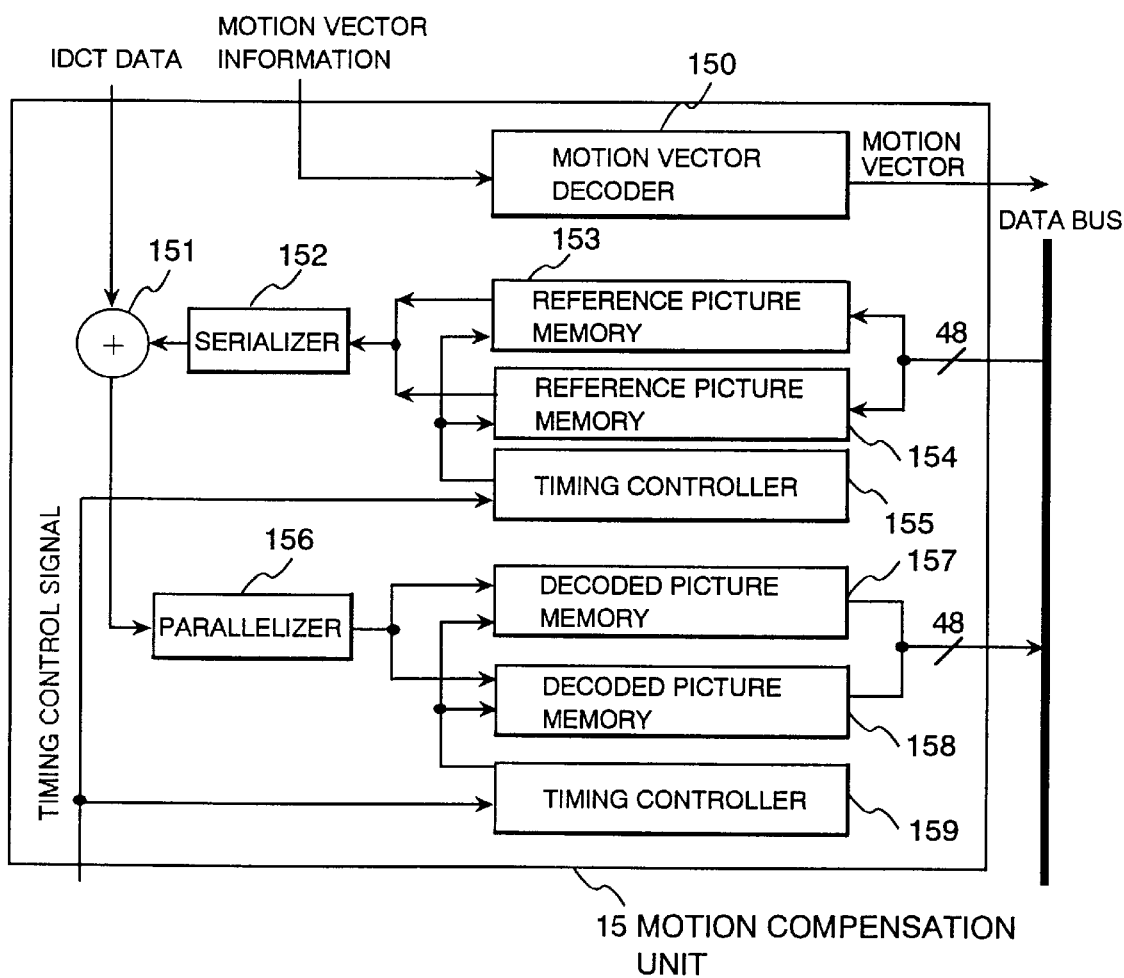
FIG. 5 is a block diagram of the motion compensation unit shown in FIG. 1.

FIG. 5 is a drawing showing the constitution of the motion compensation unit 15. In the drawing, a numeral 150 indicates a motion vector decoder, 151 an adder, 152 a serializer circuit, 153 and 154 reference picture memories, 155 a timing controller for the reference picture memories 153 and 154, 156 a parallelizer circuit, 157 and 158 decoded picture memories, and 159 a timing controller for the decoded picture memories 157 and 158.

The motion vector decoder 150 decodes difference-coded motion vector information inputted from the variable length decoding unit 13 and sends it to the memory controller 17.

Reference picture data read for motion compensation is inputted to the reference picture memories 153 and 154 from the memory 2 via the data bus and the two reference picture memories 153 and 154 are read and written alternately in macroblock units which will be described later. Namely, when one of them is in the reference picture data writing mode, the other is in the reading mode. The reference picture data depends on the frame coding type, and P frame data is data only from the previous frame, and B frame data is data from the previous and subsequent frames. The I frame requires no reference picture data and no data is read from the memory 2.

The reference picture data read from the reference picture memories 153 and 154 is set as one input of the adder 151 by the serializer circuit 152 converting data with a 48-bit width to data in pixel units. To decode coded data in the B frame, the serializer circuit 152 calculates a mean value of the reference picture data from the previous and subsequent frames if necessary and outputs the mean value. The other input of the adder 151 is IDCT picture data which is subjected to inverse discrete cosine transformation by the IDCT unit 14, and the motion compensation is realized by the adder 151, and decoded picture data is generated. In the decoded picture data, some pixels are parallelized by the parallelizer circuit 156 and the data width thereof is set to 48 bits again, and then the data is supplied to the decoded picture memories 157 and 158. The decoded picture memories 157 and 158 also operate in macroblock units in the bank format and when one is in the decoded picture data writing mode, the other is in the reading mode. Furthermore, the decoded picture data read from the decoded picture memories 157 and 158 is written into the memory 12 via the data bus.

Figure 6:
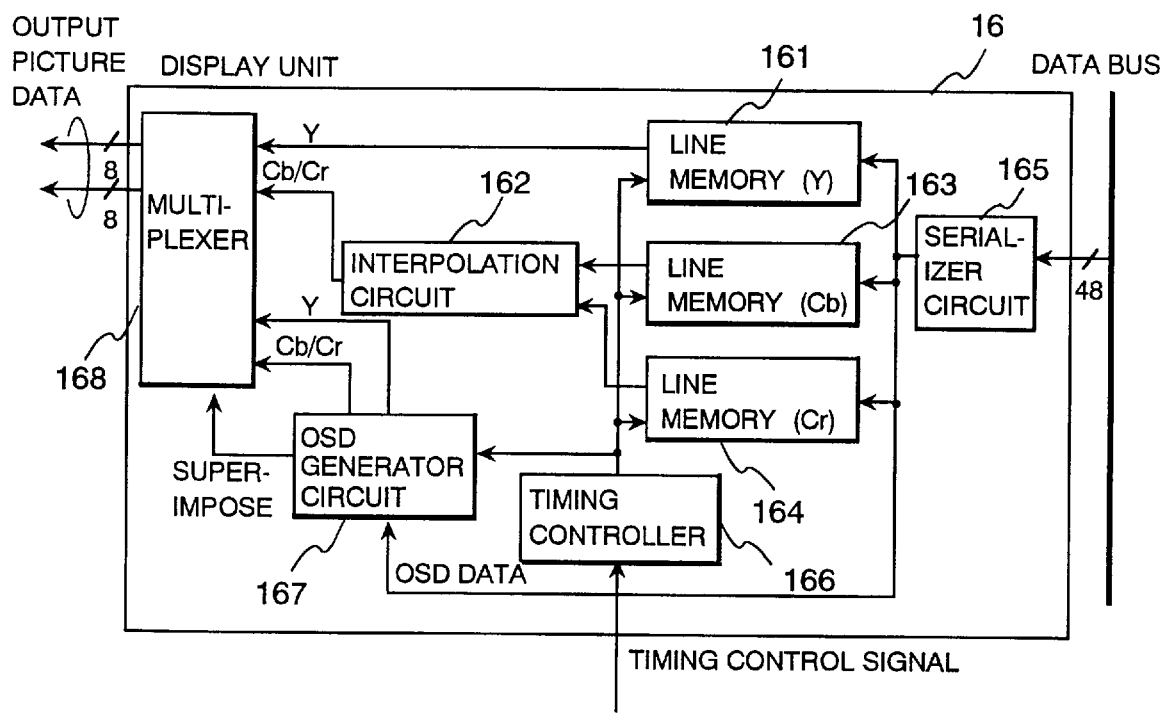
FIG. 6 is a block diagram of the display unit shown in FIG. 1.

FIG. 6 shows a detailed constitution of the display unit 16. In the display unit 16, a numeral 161 indicates a luminance line memory, 162 an interpolation circuit, 163 and 164 two kinds of chrominance signal line memories, 165 a serializer circuit, 166 a timing controller, 167 an OSD generator circuit, and 168 a multiplexer. The serializer circuit 165 converts display picture data inputted via the data bus with a 48-bit data width to data in 8-bit pixel units and outputs it sequentially. The display picture data of a luminance signal is written into the luminance signal line memory 161 and the display picture data of two kinds of chrominance signals is written into the chrominance signal line memories 163 and 164 respectively. For example, when data during one horizontal scanning period is read from the memory 2 in three times, the luminance signal line memory 161 is an FIFO memory having a capacity of 240 bytes and the chrominance signal line memories 163 and 164 are FIFO memories having a capacity of 120 bytes respectively.

The display picture data of a luminance signal is sequentially read from the luminance signal line memory 161 according to a 13.5-MHz display clock during the display period excluding the horizontal blanking period and the vertical blanking period. The display picture data of two kinds of chrominance signals is sequentially read from the chrominance signal line memories 163 and 164 at the same time according to a clock of 6.75 MHz which is ½ of the frequency of the display clock. The timing of writing and reading for each of the line memories 161, 163, and 164 is controlled by the timing controller 166 according to a timing control signal given from the timing unit 18.

The interpolation circuit 162 executes processing for interpolation in the vertical direction respectively for the display picture data of two kinds of chrominance signals and makes the number of vertical lines equal to that of the luminance signal. Thereafter, the interpolation circuit executes time division multiplexing alternately for the display picture data of the two kinds of chrominance signals in pixel units. In each field, the chrominance signal of 120 lines decoded by the processing for decoding is converted to a signal of 240 lines which are two times. For that purpose, a line memory for storing the decoded picture data of the two kinds of chrominance signals on the previous line is included in the interpolation circuit 162.

The display unit 16 can realize a function for setting an OSD area for storing OSD (on picture display) data in the memory 2, reading the OSD data from the OSD area as a part of the display picture data, generating bit map picture data of characters and graphics, and superimposing it on the display picture data.

The OSD generator circuit 167 stores and holds the OSD data read from the memory 2 internally once and generates and outputs bit map picture data of characters and graphics according to the timing of output of the display picture data.

Figure 7:
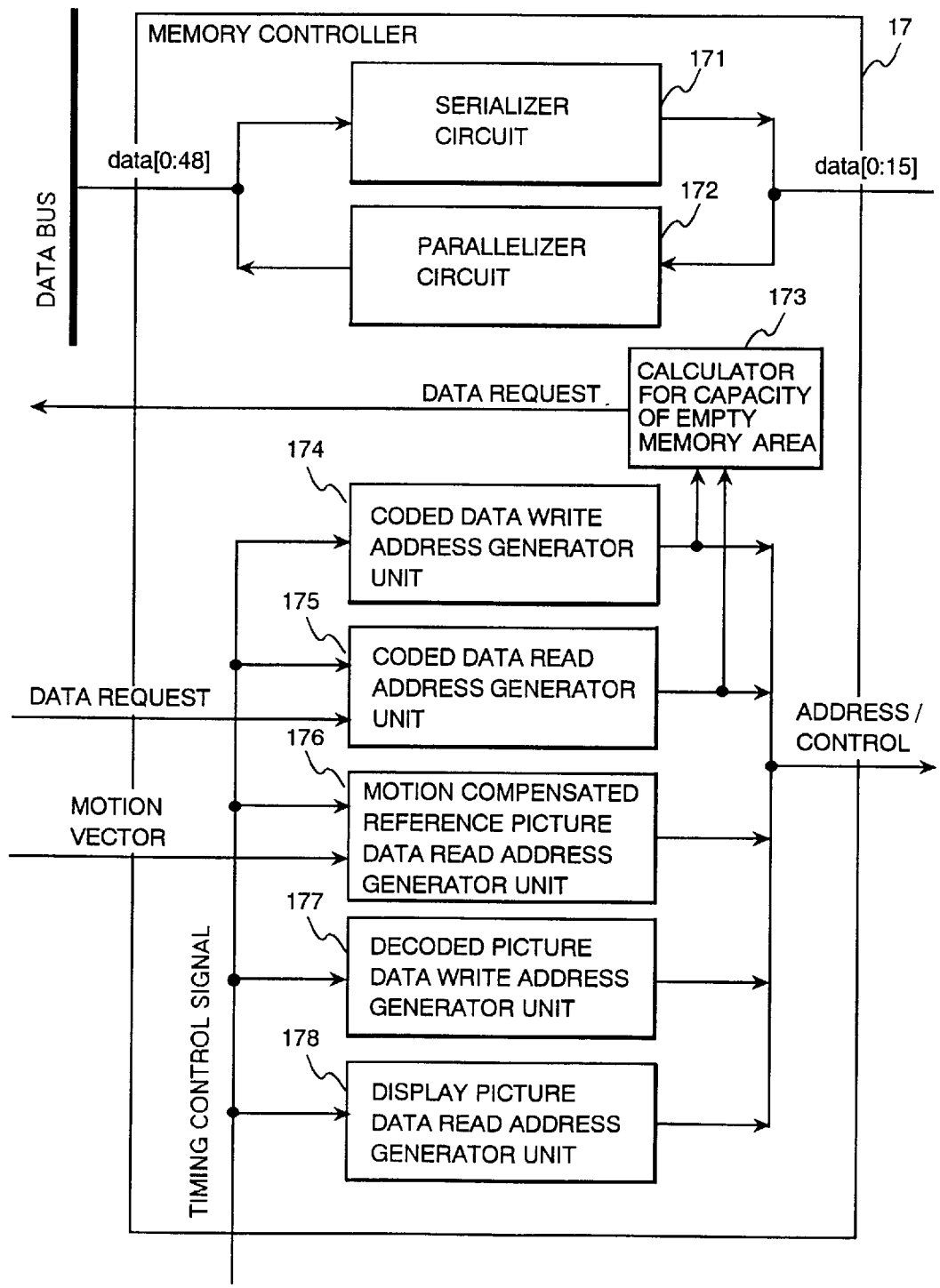
FIG. 7 is a block diagram of the memory controller shown in FIG. 1.
Figure 8:
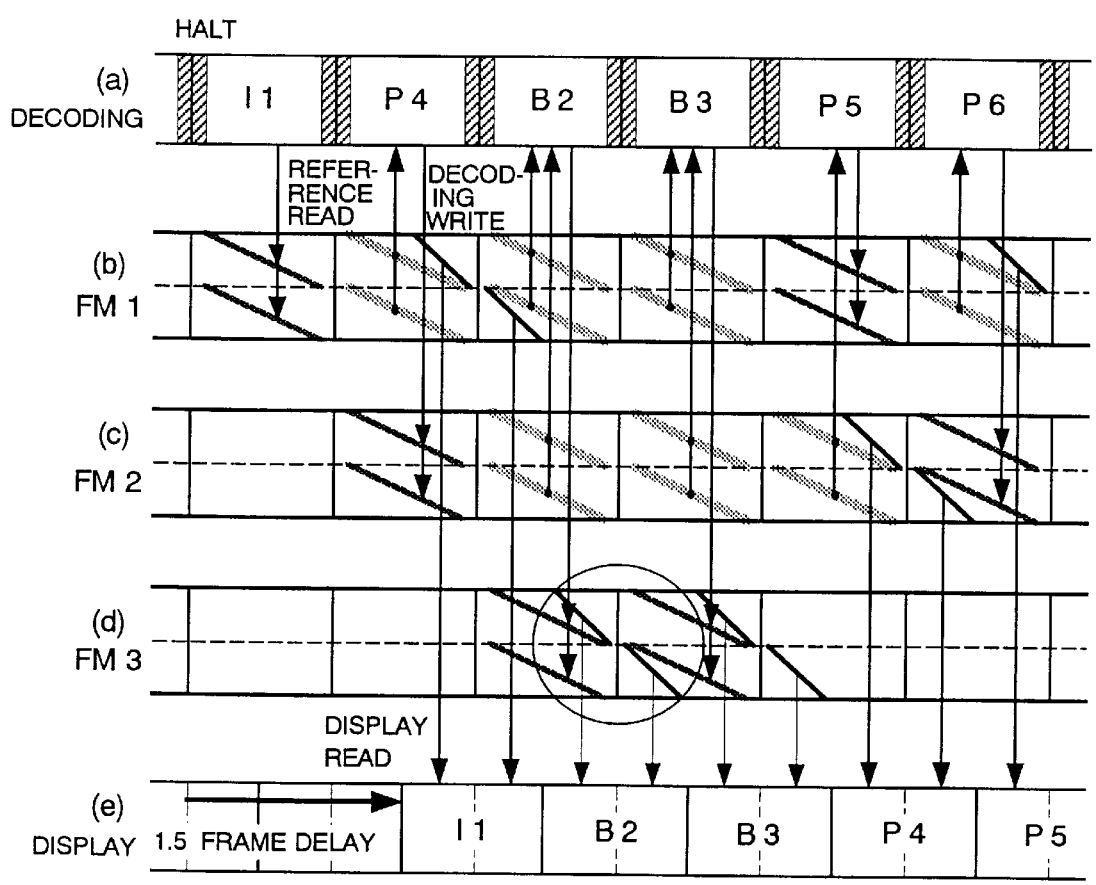
FIGS. 8(*a*) to 8(*e*) show timing drawings of the processing for decoding and the processing for display.

The multiplexer 168 superimposes the bit map picture data outputted from the OSD generator circuit 167 on the display picture data outputted from the line memories 161, 163, and 164 and outputs it as output picture data. FIG. 7 is a drawing showing the constitution of the memory controller 17. In the drawing, a numeral 171 indicates a serializer circuit, 172 a parallelizer circuit, 173 a calculator for capacity of empty memory area, 174 a coded data write address generator unit, 175 a coded data read address generator unit, 176 a motion compensated reference picture data read address generator unit, 177 a decoded picture data write address generator unit, and 178 a display picture data read address generator unit.

The serializer circuit 171 converts data inputted via the data bus from 48-bit data to three 16-bit □rial data which are the input/output bus width of the memory 2 and outputs them to the memory 2.

The parallelizer circuit 172 converts data with a 16-bit width inputted from the memory 2 to three serially continuous data in parallel and outputs them to the data bus as 48-bit data.

The numerals 174 to 178 generate an address signal and a control signal of the memory 2. Depending on the kind of data outputted to the memory 2 or inputted from the memory 2, one of the units operates and the output of the address generator unit which is operating is supplied to the memory 2 as an address signal and a control signal.

The coded data write address generator unit 174 generates address and control signals for writing coded data sequentially and controls writing of coded data into the memory 2. The coded data read address generator unit 175 generates address and control signals for reading coded data sequentially and controls reading of coded data from the memory 2. When no data request signal is given from the decoding data buffer memory 12, even during a period that coded data can be read, the reading of coded data from the memory 2 is halted. The calculator for capacity of empty memory area 173 calculates the capacity of empty area of the buffer memory for coded data allocated to the memory 2 from the write address generated by the coded data write address generator unit 174 and the read address generated by the coded data read address generator unit 175 and outputs a data request signal to the input buffer memory 11 when there exists a free area for storing the coded data.

The motion compensated reference picture data read address generator unit 176 generates address and control signals for reading reference picture data sequentially and controls reading of reference picture data from the memory 2. An offset value is added to the reference picture data read address according to the motion vector value given from the motion compensation unit 15. The kind of reference picture data to be read depends on the coding type of the frame during decoding and there may be no need to read it. Therefore, the number of necessary data for reading as reference picture data depends on each case. Therefore, even during a period that the reference picture data can be read, the reading of reference picture data from the memory 2 may end halfway. The decoded picture data write address generator unit 177 generates address and control signals for writing decoded picture data sequentially and controls writing of decoded picture data into the memory 2. The display picture data read address generator unit 178 generates address and control signals for reading display picture data (there is a case that OSD data is included) sequentially and controls reading of display picture data from the memory 2. In this case, the unit 178 selects one of the three frame memories in the memory 2 according to the coding type outputted from the variable length decoding unit 13 and generates an address corresponding to it.

FIGS. 8(a) to 8(e) 9, and 10(a) to 10(c) are drawings showing a control system of the memory 2 for synchronizing the processing for decoding and the processing for display. This memory control is executed by the memory controller 17 on the basis of a timing control signal generated by the timing unit 18 from a horizontal synchronization signal and a vertical synchronization signal.

FIGS. 8(a) to 8(e) show drawings for explaining the flow and timing of the decoding process and the display process. FIG. 8(a) shows the frame order of coded data to be decoded and FIG. 8(e) shows the frame order of display picture data to be displayed. FIGS. 8(b) to 8(d) show memory images of three frame memories (hereinafter referred to as FM1 to FM3) in the memory 2 respectively on the assumption that each frame memory consists of two field memories. The downward arrows directed from FIG. 8(a) toward FIGS. 8(b) to 8(d) indicated writing of decoded picture data, and the upward arrows directed from FIGS. 8(b) to 8(d) toward FIG. 8(a) indicate reading of reference picture data, and the downward arrows directed from FIGS. 8(b) to 8(d) toward FIG. 8(e) indicate reading of display picture data.

According to the present invention, the processing for decoding is executed so that the processing for decoding of coded data of each frame always ends within the one-frame period and the processing for decoding of coded data is stopped only for the predetermined time during the processing for decoding of each frame. The timing drawings can be applied to the processing for decoding and the processing for display of coded data of two current TV video signals of the 525/60 and 625/50 systems.

The decoded picture data is written into one of FM1 to FM3. The decoded picture data of the I frame or the P frame to be used so as to predict the P frame and the B frame is written into FM1 and FM2 alternately. The decoded picture data of the B frame is written into FM3. The thicker solid lines shown in FIGS. 8(b) to 8(d) indicate the writing situation of decoded picture data.

To decode the coded data of the P frame, the decoded picture data of the previous frame is read from FM1 or FM2 as reference picture data. Selection of FM1 or FM2 so as to read the reference picture data is controlled by selection of the frame memory where a frame close to the frame being decoded at present on a time basis is stored. As a frame memory where the decoded picture data is written, a frame memory different from the frame memory where the reference picture data is read is selected and the decoded picture data is written into it. To decode the coded data of the B frame, the decoded picture data of the previous frame and the subsequent frame are read from both of FM1 and FM2 as reference picture data. The hatched lines shown in FIGS. 8(b) to 8(d) 10(b) indicate reading of the reference picture data.

As shown in the drawing, in the processing for decoding of each frame, the processing for decoding of coded data is stopped for the predetermined time. The blocks 13, 14, and 15 of each processing for decoding include a decoding stopping means for stopping the processing for decoding on the basis of a timing signal received from the timing unit 18.

Display picture data can be obtained by reading decoded picture data of a frame which is stored in one of FM1 to FM3 in the display order during the one-frame period. The frame period for decoding and the frame period for display are shifted from each other by a 0.5 frame, that is, the one-field period.

Reading of the display picture data of the B frame for display is started the one-field period behind the frame period that it is decoded and started to be written into FM3. In the I frame and the P frame, there further exists a delay caused by the processing for frame reordering. In FIGS. 8(b) to 8(d), each of the thinner solid lines indicates the situation of reading of display picture data. Selection of the frame memory for the processing for display is decided by observing the coding type of the frame during decoding. As to the I frame and the P frame, they coincide with the frame memory where the reference picture data of FM1 or FM2 is read except a delay of a field. The B frame coincides with FM3.

As shown by B2 and B3 in FIGS. 8(a) to 8(e) when a plurality of B frames are continued, the decoded picture data of the B frames which are obtained by decoding them are written into FM3 during the continuous frame period. Therefore, before the decoded picture data of the previous B2 frame is rewritten because new decoded picture data of the B3 frame is written, it is necessary to display and read the decoded picture data of the B2 frame. To realize this, a delay of the one-field period is provided between the decoding and writing of the B frame and the display and reading thereof and the predetermined halt period is provided for executing the processing for decoding of coded data at the same time. The halt period of the processing for decoding is provided not only for the B frame but also for the I frame and the P frame. By doing this, the timing of decoding is made equal regardless of the frame coding type and the writing of decoded picture data is made common regardless of the coding type.

Figure 9:
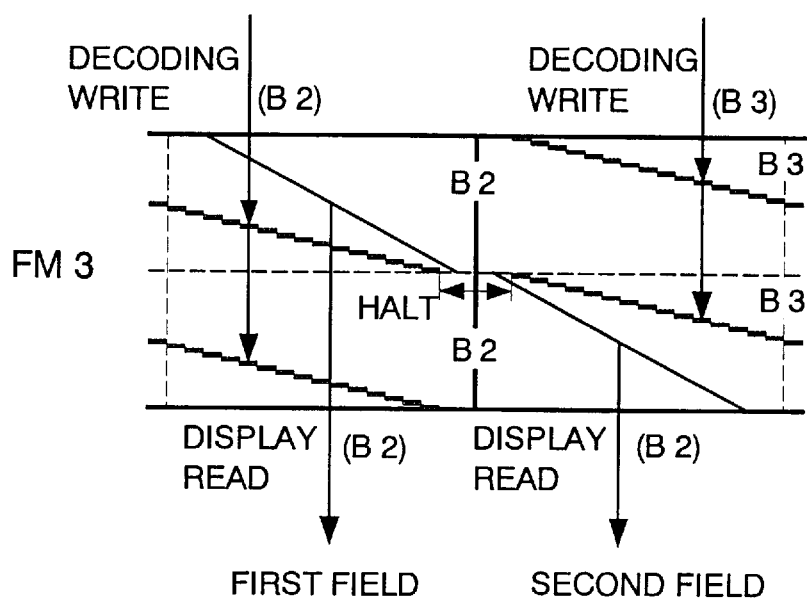
FIG. 9 is an enlarged view of the timing shown in FIG. 8(*d*).
Figure 10:
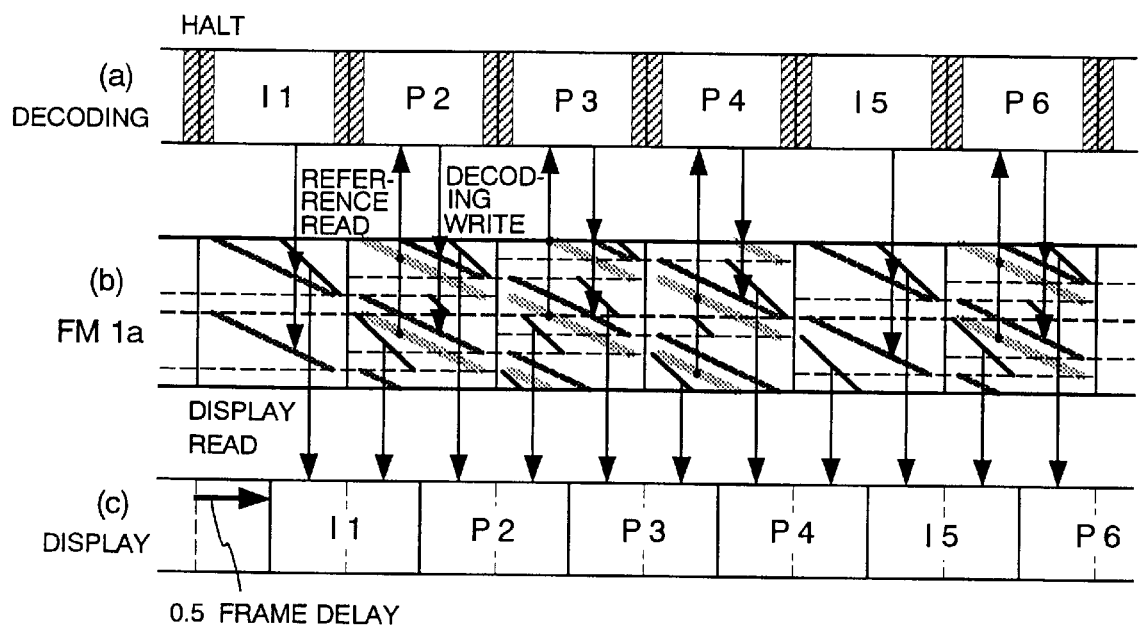
FIGS. 10(*a*) to 10(*c*) show timing drawings of the processing for decoding and the processing for display when the B frame is not included.

FIG. 9 is an enlarged view of the portion enclosed by the ellipse in FIG. 8(d) showing the situation of memory control of FM3 when the B frames are continued so as to explain the halt period of the processing for decoding. The shape of small rectangles continued stepwise from the upper left to the lower right shown in FIG. 9 indicates the situation of decoding write address changes. The addresses of FM3 are allocated in the interlace display scanning order such as from left pixels to right pixels, from upper lines to lower lines, and furthermore from the first field to the second field. Therefore, for decoding write in each block in the B frame, write addresses are not increased continuously but addresses are skipped halfway. For decoding write in a frame, although write addresses are discontinued, addresses are increased gradually as a whole.

Assuming that a set of all blocks which are lined horizontally in a frame with the vertical position equal is called a block line, write addresses for decoding write and read addresses for display read are converted in block column units. This is equivalent to a set of pixels of 16 lines. Therefore, decoding write addresses after the blocks are decoded sequentially in each block line are positioned at least within the range of addresses corresponding to each pixel in the block line. Namely, they are addresses for 16 lines. This address range corresponding to each block line is indicated by the small rectangles shown in FIG. 9. The height of the rectangles is equal to a half of the number of vertical lines constituting the block lines in the frame, that is, the address range corresponding to the number of vertical lines in the field such as addresses for 8 lines.

In FIG. 9, the thick solid line drawn from the upper left to the lower right indicate reading of display picture data.

In the range shown in the drawing, the B frame indicated by B2 is read. For display reading in 2 fields in the B frame like this, read addresses are increased continuously.

However, during the vertical blanking period existing between the field and the field, the display read is halted temporarily. The inclination of the solid line indicating a change of the display reading addresses is two times of the inclination of the steps of lined rectangles indicating a change of the decoding write addresses.

It is necessary to execute display read for reading each pixel data of B2 sequentially from FM3 after the decoded picture data of the pixel of B2 is written into FM3 by decoding write and before it is rewritten by decoding write of B3 which is the next B frame. Namely, it is prohibited that the shape of rectangles connected stepwise indicating a change of the write addresses of the decoded picture data intersects with the solid line indicating a change of the display addresses of the display picture data. For that purpose, in this embodiment, a delay of the one-field period is provided between the decoding write of the B frames and the display read and the predetermined halt period is provided for executing decoding of the coded data of each frame at the same time. Namely, the decoding write of the B2 frame is completed before the display read of the first field of the B2 frame ends and the display read of the second field of the B2 frame starts before the decoding write of the B3 frame starts.

The length of the halt period provided between the frame periods for decoding each frame is the sum of the display period of all the lines of the lowest block line in the first field, the vertical blanking period between the first field and the second field, and the display period of all the lines of the uppermost block line in the second field. For example, the vertical blanking period between the first field and the second field in the 625/50 system is equivalent to the display period of about 25 lines, so that the length of the halt period of the processing for decoding is the time equivalent to the display period of 8+25+8=41 lines. To shorten the halt period and keep the processing period for decoding each block as long as possible, the halt period is suppressed to the minimum length.

According to the memory control system of the present invention as mentioned above, the processing for decoding and the processing for display can be executed by three frame memories. The memory capacity of a frame necessary in the 625/50 system is about 4.7M bits, so that the total frame memory capacity is about 14M bits. The delay time from decoding start of coded data to display start of display picture data can be set to a period of 1.5 frames.

FIGS. 10(a) to 10(c) are illustrations showing the flow and timing of the processing for decoding and the processing for display when no frame-interpolation coding is used. In this example, only a frame memory (FM1α) is used. The size thereof is set to a one slightly larger than the capacity of one frame. FIG. 10(a) shows the frame order of coded data to be decoded and FIG. 10(c) shows the frame order of display picture data to be displayed. FIG. 10(b) shows the situation of memory access of FM1α and two field memories whose size is larger than that of one field by the predetermined size are shown separately. The two field memories are separated by a thick dashed line. The downward arrows from FIG. 10(a) toward FIG. 10(b) indicate the situation of decoding write, and the upward arrows from FIGS. 10(b) toward FIG. 10(a) indicate reading of reference picture data, and the downward arrows from FIG. 10(b) toward FIG. 10(c) indicate reading of display picture data. In the drawing, when decoded picture data is written into FM1α, the write address into each field memory is decided as follows: An offset of one field is added to the write address into each field memory for each frame period and then a modulo operation is executed according to the capacity of each field memory whose size is larger than that of one field by the predetermined size. Namely, each field memory is used as a ring buffer. The thicker solid lines shown in FIG. 10(b) indicate the writing situation of the decoded picture data.

In the inter-frame coded blocks in the P frame, the decoded picture data of the previous frame which is stored in FM1α is read as reference picture data. In this case, a positive or negative offset is added to the read address according to the size of the motion vector. The decoded picture data which is decoding-written in the previous frame is reference-read. Therefore, the same offset as that of the previous frame is added to the read address from each field memory and then a modulo operation is executed according to the field memory capacity. In FIG. 10(b), the hatched lines indicate this situation.

Display read of decoded picture data is executed by reading the decoded picture data of each frame which is stored in FM1α during each frame period. In the same way as FIGS. 8(a) to 8(e), the frame period for decoding and the frame period for display are shifted from each other by the one-field period. The decoded picture data for which decoding write is started from one field ahead is display-read, so that the same offset as that of the decoding write address is added to the read address from each field memory and then a modulo operation is executed according to the field memory capacity. In FIG. 10(b), the thinner solid lines indicate the situation of this display read.

The capacity of each field memory is made larger than that of a field by the predetermined size because it is necessary to complete reading of the reference picture data of the previous frame and reading of the display picture data before the decoded picture data of the frame memory FM1α is rewritten by decoding write of a new frame. Namely, the capacity is made larger by the size corresponding to the maximum of the number of vertical lines which is the range that the block is shifted according to the motion vector in the field so that the densely hatched lines indicating a change of the decoding write address and the thinly hatched lines indicating a change of the reference read address do not intersect with each other. For example, for a TV signal of the 625/50 system, the capacity of each field memory is set to a capacity which is larger than that of one field by 64 lines for a luminance signal and the total capacity of the frame memories is about 5.8M bits (1M bits=1024×1024 bits). A halt period is provided between the frame periods for decoding each frame and the length of the halt period is the same as that shown in FIGS. 8(a) to 8(e).

As mentioned above, in the example shown in FIGS. 8(a) to 8(e), the apparatus may consist of a frame memory whose size is slightly larger than that of one frame. The delay time from decoding start of coded data to display start of decoded picture data is a 0.5-frame period, so that the frame memory capacity can be reduced and the delay time from decoding to display can be shortened by a frame, that is, to 0.5 frames at the same time. As mentioned above, this memory control system is effective in executing the decoding and displaying of coded data by the coding system in which no-use of the B frame is specified with a small number of memories in a short delay time.

When the memory has a capacity of 16M bits and furthermore the coded data includes information about the kind of coded data as a multiplexed flag, it is possible to automatically switch the memory control system shown in FIGS. 8(a) to 8(e) and the memory control system shown in FIGS. 10(a) to 10(c) by this flag. By using this system, an apparatus for picture decoding can respond to a two-way communication system in which a short delay time is essential and only I and P are coded and both of a broadcasting receiving system and a reproducing system for recording media in which a high picture quality is desired and I, P, and B are all coded.

Figure 11:
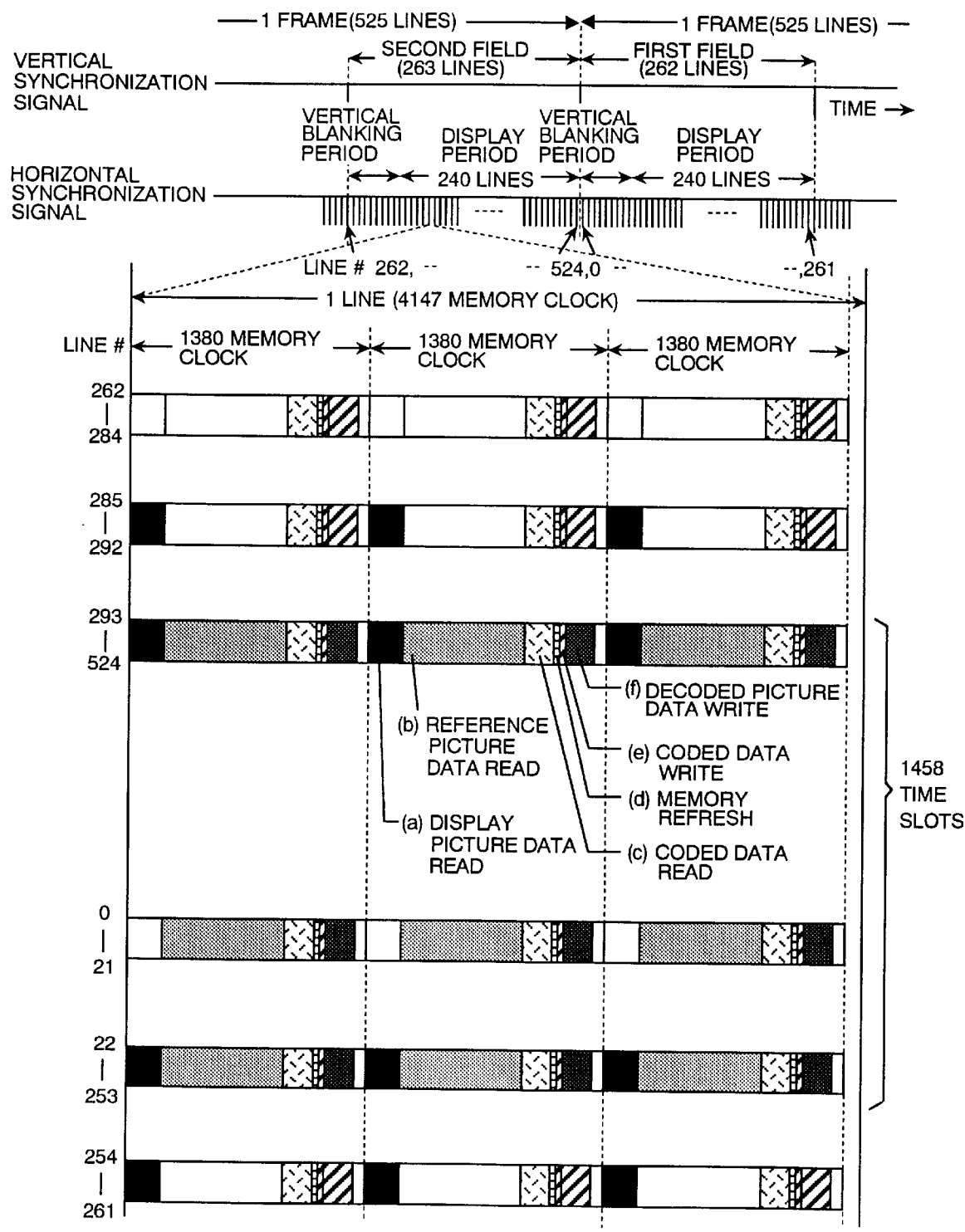
FIG. 11 is a drawing for explaining the memory control system corresponding to a TV signal of the 525/60 system.

FIG. 11 is a drawing for showing the control system of the memory 2 for executing the processing for synchronization for the processing for decoding and the processing for display during the frame period and a drawing for explaining an example of the 525/60 system. In this example, access to the memory 2 in the processing for decoding and the processing for display is executed by the fixed time slot which is decided on the basis of a horizontal synchronization signal and a vertical synchronization signal.

In the 525/30 system, the frame frequency is 30 Hz and the sampling frequency of a luminance signal is 13.5 MHz. One frame consists of 525 lines in total, and the first field constituting one frame consists of 262 lines, and the second field consists of 263 lines. For example, when a clock of 65.25 MHz is used as a memory clock, the one-line period is a time of 858×29/6=4147 clocks. The one-line period is divided into three macroblock time slots of 1380 clocks each and the remaining 7 clocks are dummy slots. In the dummy slots, the data access to the memory 2 is halted.

1458 time slots allocated to the 293rd line to the 524th line and to the 0th line to the 253rd line are used for decoding coded data of one frame. On the 285th line to the 524th line, the picture data in the second field of the frame which is already decoded is displayed and on the 22nd line to the 261st line, the picture data in the first field of the frame which is decoded at present is displayed. In each macroblock time slot, various data accesses to the memory 2 relating to the processing for decoding of one macroblock and reading of the decoded picture data to be displayed from the memory 2 are executed on a time division basis. The processing for decoding of coded data of one macroblock is also executed according to the macroblock time slots.

The macroblock is a set of picture data in an ares of 16 pixels×16 lines for a luminance signal or 8 pixels×8 lines for two chrominance signals. The block size is 8×8 pixels and consists of 4 blocks for a luminance signal or one block for two kinds of chrominance signals respectively. Therefore, one macroblock consists of 6 blocks in total. One frame consists of 720 pixels×480 lines, so that one frame consists of (720/16)×(480/16)=1350 macroblocks. To decode coded data of one frame, 1458 time slots are allocated for the one-frame period, so that when the processing for decoding of one macroblock is basically executed in each time slot, processing for decoding of one frame can be realized during the one-frame period.

As shown in FIG. 11, in each macroblock time slot, in relation to memory access necessary for the processing for decoding and the processing for display, three kinds of time slots for reading from the memory 2 such as (a) display picture data read, (b) reference picture data read, and (c) coded data read are provided. Next, a time slot for (d) memory refresh is provided. Cyclic refreshing is necessary for the memory 2 consisting of a dynamic memory device, so that in (d) memory refresh, dummy reading of the memory 2 is executed by increasing the address sequentially. Furthermore, two kinds of periods for writing into the memory 2 such as (e) coded data write and (f) decoded picture data write are provided.

Although not shown in the drawing, when the apparatus has an OSD function, (g) OSD data read and (h) OSD data write are provided in addition to them.

In the decoding circuit 1 shown in FIG. 1, the input buffer memory 11 writes coded data from the internal FIFO memory into the memory 2 during the (e) coded data write slot period. The decoding data buffer memory 12 reads coded data from the memory 2 and writes it into the internal FIFO memory during the (c) coded data read slot period. The motion compensation unit 15 reads reference picture data of one macroblock from the memory 2 and writes it into the internal reference picture memory during the (b) reference picture data read slot period and writes decoded picture data from the internal decoded picture memory into the memory 2 during the (f) decoded picture data write slot period. Furthermore, the display unit 16 reads display picture data from the memory 2 and writes it into the internal line memory during the (a) display picture data read slot period.

Figure 12:
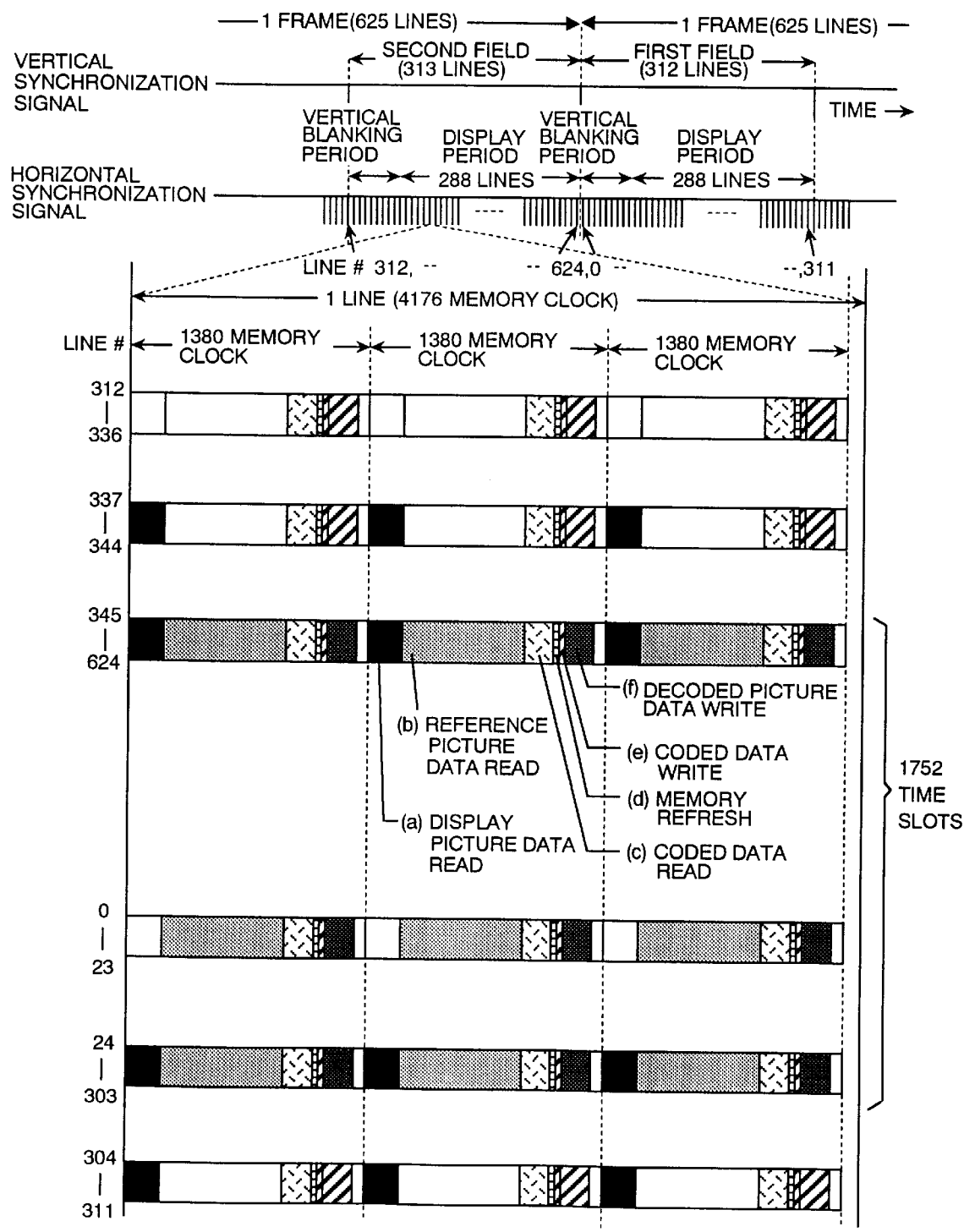
FIG. 12 is a drawing for explaining the memory control system corresponding to a TV signal of the 625/50 system.

FIG. 12 is a drawing for explaining the memory control system corresponding to a TV signal of the 625/50 system and corresponds to FIG. 11 showing the case of the 525/60 system.

In the 625/50 system, the frame frequency is 25 frames/second and the sampling frequency of a luminance signal is 13.5 MHz. The memory clock is created from this sampling frequency and is the same as that in the 525/60 system. One frame consists of 625 lines, and the first field constituting one frame consists of 312 lines, and the second field consists of 313 lines.

The one-line period is a time of 864×29/6=4176 clocks, and the one-line period is divided into three time slots of 1380 clocks each, and the remaining 36 clocks are dummy slots. The number of clocks during the one-line period which is selected is the same as that in the 525/60 system so as to enhance the commonalty of decoding and display and a difference between the two is absorbed by the number of clocks of the dummy slots. During the dummy slot period, the data access to the memory 2 is halted.

1752 macroblock time slots allocated to the 345th line to the 624th line and to the 0th line to the 303rd line are used for decoding coded data of one frame. On the 337th line to the 624th line, the picture data in the second field of the frame which is already decoded is displayed and on the 24th line to the 311th line, the picture data in the first field of the frame which is decoded at present is displayed. In each macroblock time slot, various data accesses to the memory 2 relating to the processing for decoding of one macroblock and reading of the decoded picture data to be displayed from the memory 2 are executed on a time division basis. The processing for decoding of one macroblock is also executed according to the macroblock time slots.

One frame consists of 720 pixels×576 lines, so that one frame consists of (720/16)×(576/16)=1620 macroblocks. To decode coded data of one frame, 1752 time slots are allocated for the one-frame period, so that when the processing for decoding of one macroblock is basically executed in each time slot, processing for decoding of one frame can be realized during the one-frame period.

In each macroblock time slot, in the same way as with the 525/60 system shown in FIG. 11, a plurality of kinds of time slots such as (a) display picture data read, (b) reference picture data read, (c) coded data read, (d) memory refresh, (e) coded data write, and (f) decoded picture data write are provided. The remaining time slots after the above processing ends are a margin area and the memory access is halted basically.

In either of FIGS. 11 and 12, time slots for executing the processing for decoding and the processing for display for one macroblock are allocated. However, for example, time slots may be allocated in a smaller unit such as 2-block unit. In this case, the switching frequency of the memory access process is increased, so that the processing of the timing unit and the memory controller is slightly complicated. However, the size of a working memory necessary for each processing circuit for executing decoding and display can be reduced from the value corresponding to one macroblock to the value corresponding to two blocks.

Figure 13:
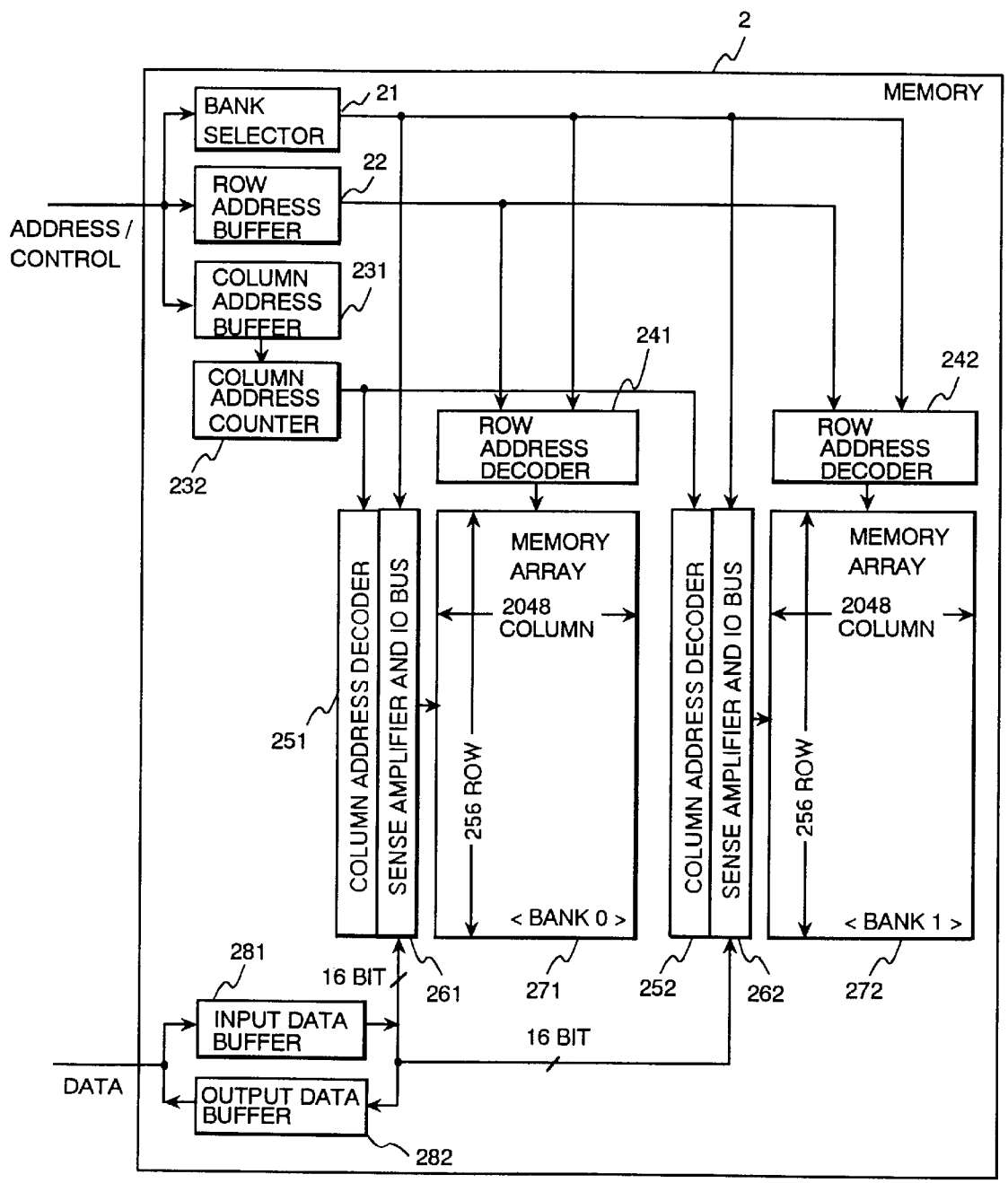
FIG. 13 is a block diagram of the memory shown in FIG. 1.

FIG. 13 shows an example of the constitution of the memory 2 so as to allow efficient access to the memory 2 from the decoding unit 1. A numeral 21 indicates a bank selector, 22 a row address buffer, 231 a column address buffer, 232 a row address counter, 241 and 242 row address decoders, 251 and 252 column address decoders, 261 and 262 sense amplifiers and IO buses, 271 and 272 memory arrays, 281 an input data buffer, and 282 an output data buffer.

The memory 2 includes two memory arrays and each memory array has address control circuits such as a row address decoder and a row address decoder.

An address and a control signal are inputted to the bank selector 21, the row address buffer 22, and the column address buffer 231. The bank selector 21 judges the bank on which the address is effective and controls the row address decoders 241 and 242 and the column address buffer 231. When the address is a row address, the bank selector 21 supplies it to the row address decoders 241 and 242 via the row address buffer 22 and makes the memory array corresponding to the specified row of the memory array 271 or the memory array 272 active according to the decoding result of the row address decoder 241 for the memory array 271 (hereinafter referred to as Bank 0) or the row address decoder 242 for the memory array 272 (hereinafter referred to as Bank 1). When the address is a column address, the bank selector 21 holds it in the column address buffer 231 once and regenerates a column address and by the column address counter 232 on the basis of the held value. By doing this, a column address in the same row can be generated automatically without being supplied continuously. The column address after regeneration is decoded by the column address decoder 251 or the column address decoder 252. When the memory is in the write mode, the bank selector 21 writes data to be inputted in the specified address of the memory array 271 or 272 via the input data buffer 281 and the sense amplifier and IO bus 261 or 262. When the memory is in the read mode, the bank selector 21 reads the data in the specified address of the memory array 271 or 272 via the sense amplifier and IO bus 261 or 262 and outputs it via the output data buffer 282.

Figure 14:
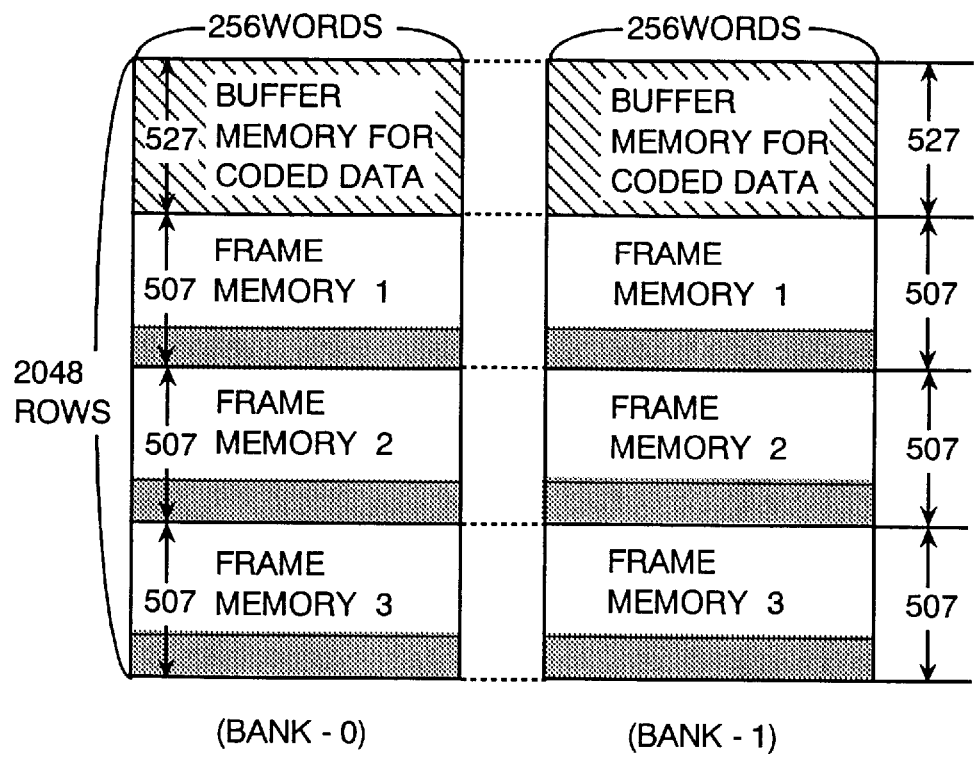
FIG. 14 is a drawing showing an embodiment of division of the memory area shown in FIG. 13.

FIG. 14 is a drawing showing a map of data arrangement of the memory 2. The numerals shown in the drawing correspond to those of the 525/60 system and an example of a case that picture data of one frame consists of 720 horizontal pixels and 480 vertical lines is shown. The memory arrays 271 and 272 of Bank 0 and Bank 1 are mapped in three frame memories consisting of 507 rows including 528 rows in the buffer area for coded data.

Figure 15:
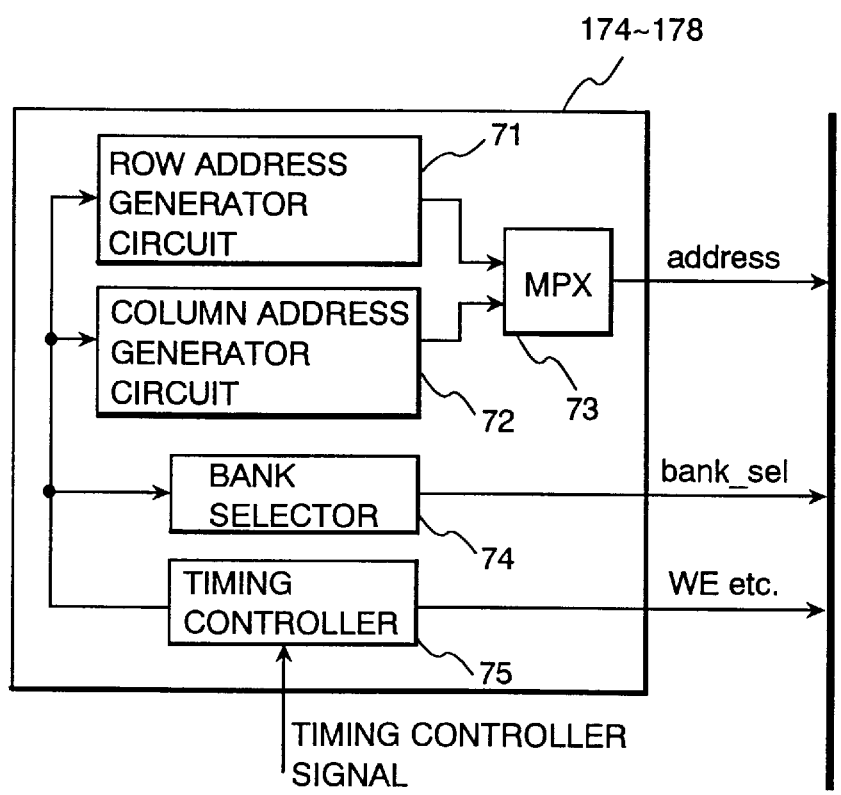
FIG. 15 is a block diagram of a memory control signal generator unit for the memory shown in FIG. 13.

FIG. 15 is a drawing showing the constitution of various address generator units from the coded data write address generator unit 174 to the display picture data read address generator unit 178 in the memory controller 17 and the constitution includes a bank switching control function in correspondence with the memory 2 shown in FIG. 13. In the motion compensated reference picture data read address generator unit 176, the portion where offset values of row and column addresses are given by the motion vector is not shown in the drawing. In FIG. 15, a numeral 71 indicates a row address generator circuit, 72 a column address generator circuit, 73 a multiplexer, 74 a bank selector, and 75 a timing controller.

The row address generator circuit 71 generates a row address of the memory 2 and the column address generator circuit 72 also generates a column address of the memory 2. The row and column addresses are multiplexed by the multiplexer 73 and outputted to the address bus. The bank selector 74 generates a bank select signal (bank_sel) of the memory 2 and the timing controller controls the operations of the row and column address generator circuits 71 and 72 and the bank selector 74 and also generates a control signal such as a write enable timing signal (WE).

Figure 16:
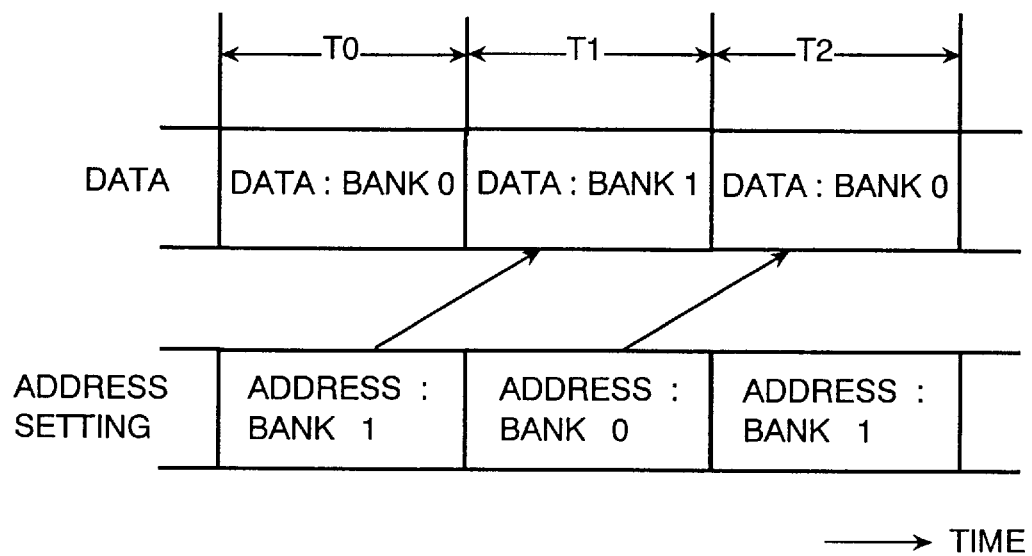
FIG. 16 is a drawing showing the control timing for the memory shown in FIG. 13.

FIG. 16 is a drawing showing the control timing of the memory controller 17 for the memory 12. The sections T0, T1, T2, - - - are more finely detailed operation timing of one time slot (hereinafter one section of T0, T1, T2, - - - is referred to as a bank access slot) corresponding to one of the processing for decoding and the processing for display shown in FIGS. 11 and 12. The memory control such as (a) display picture data read, (b) reference picture data read, (c) coded data read, (d) memory refresh, (e) coded data write, and (f) decoded picture data write shown in FIGS. 11 and 12 performs read or write access to Bank 0 and Bank 1 in the memory 2 alternately in units of this bank access slot. Namely, in the same bank access slot, the row address is not changed. The row address is changed during the previous period of one bank access slot when the different bank is accessed. By doing this, the waiting period accompanying row address changing becomes unnecessary apparently and the effective memory band width is improved. The bank access slots in the processes (a) to (f) may be different in length.

Furthermore, the memory control operation for executing access to different banks alternately is followed even in a part extending over different processing times such as from (a) display picture data read to (b) reference picture data read, from (b) reference picture data read to (c) coded data read, furthermore from (e) coded data write to (f) decoded picture data write or from (f) decoded picture data write to (a) display picture data read. Therefore, it is necessary to select arrangement of coded data and decoded picture data in the memory so that the access to the memory 2 in each process starts from Bank 0 and ends at Bank 1 or vice versa.

Figure 17:
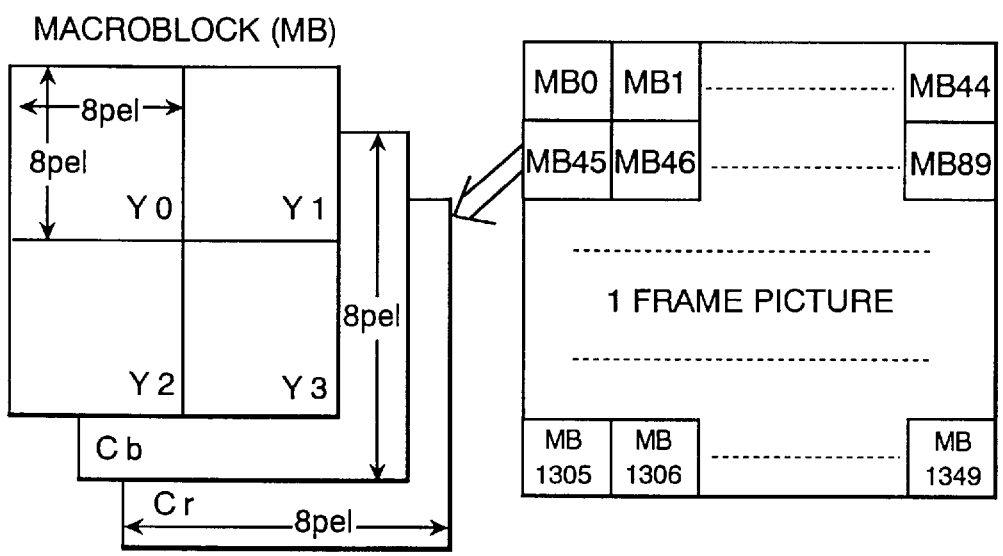
FIG. 17 is a drawing showing block division of a one-frame picture of the present invention.

As to (c) coded data read and (e) coded data write, one row of Bank 0 and Bank 1 in the memory 2 has 256 column addresses and it is necessary to prevent changing of the row address in the bank access slot, so that the length of the bank access slot period is set to 8 words (8 column addresses). Each time slot of (c) coded data read and (e) coded data write can start access from Bank 0 and end access at Bank 1 when the bank access slots are even. Therefore, when coded data is written into the memory 2 from the input buffer memory 11, the apparatus ascertains that coded data of at least 16 words exists in the input buffer memory 11 beforehand. When coded data is read from the memory 2 and written into the decoding data buffer memory 12, the apparatus ascertains that a free area of at least 16 words exists in the decoding data buffer memory 12 beforehand. FIG. 17 is a drawing showing the situation of block division of a one-frame picture. In this example, it is assumed that luminance signal in one frame consists of 720 pixels×480 lines and a chrominance signal (expressed by Cb or Cr in the drawing) has a pixel density which is ½ of that of a luminance signal (expressed by Y in the drawing) in the horizontal and vertical directions. As shown in the drawing, the macroblock is defined as a set of 6 blocks in which the blocks of the luminance signals almost coincide with the blocks of the chrominance signals in area. Using this macroblock, the one-frame picture consists of 45 macroblocks in the horizontal direction and 30 macroblocks in the vertical direction, a total of 45×30=1350 macroblocks.

Figure 18:
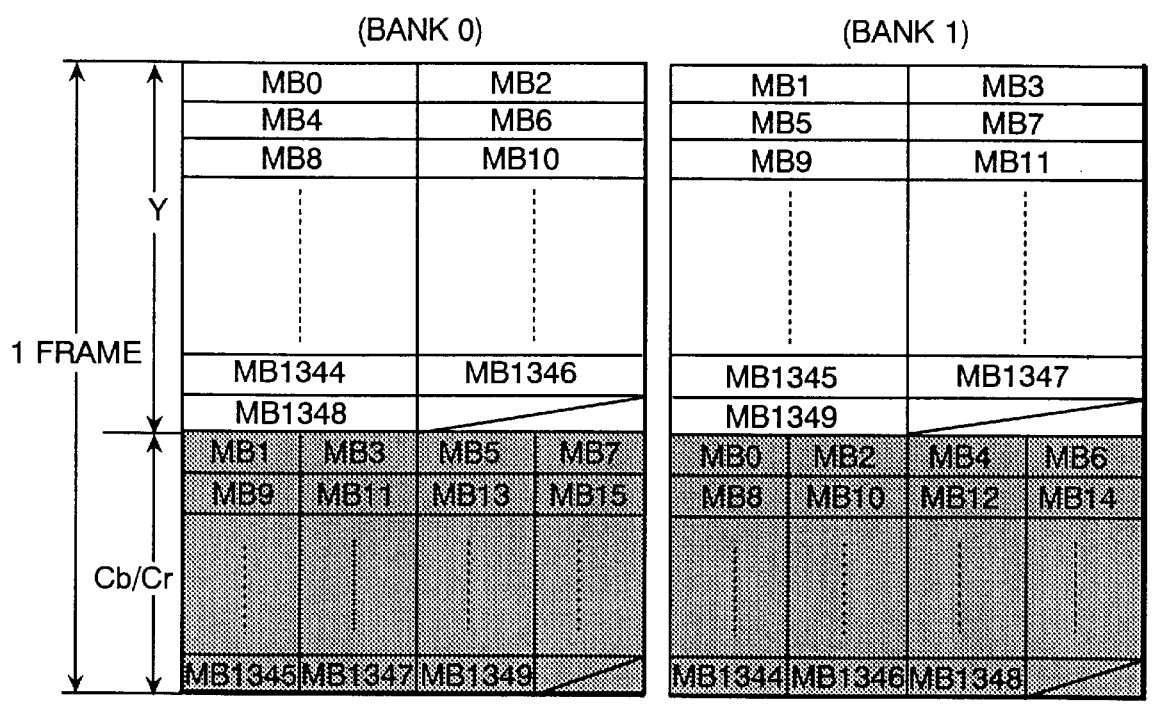
FIG. 18 is a drawing showing mapping of the macroblock into the frame memory area in the memory shown in FIG. 13.

FIG. 18 is a drawing showing mapping of picture data in units of the aforementioned macroblock into the frame memory area of the memory 2. As shown in the drawing, picture data of one macroblock is stored in correspondence with the position of one row address of one bank when the luminance signals and the chrominance signals are mapped into different banks. Furthermore, the picture data corresponding to the macroblock neighboring with the horizontal position on the picture is stored in a different bank.

On the basis of the aforementioned arrangement, for memory access of (f) decoded picture data write, when one bank access slot corresponds to the picture data of the luminance signal in the macroblock, and one bank access slot corresponds to the picture data of the chrominance signal in the macroblock, and decoded picture data is written in the order of the luminance signal first and the chrominance signal next for a macroblock of an even number, and decoded picture data is written in the order of the chrominance signal first and the luminance signal next for a macroblock of an odd number, Bank 0 and Bank 1 can be always accessed alternately.

Figure 19:
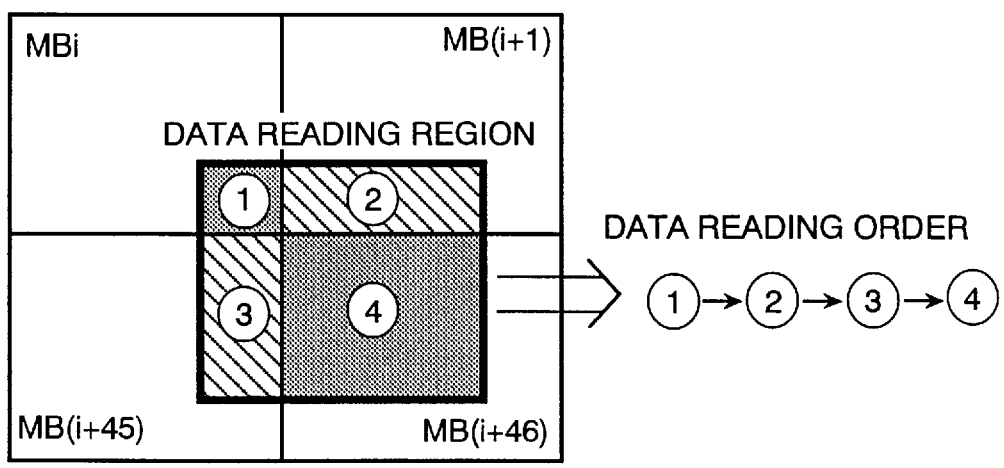
FIG. 19 is a drawing showing the reference picture data reading order of the present invention.
Figure 1:
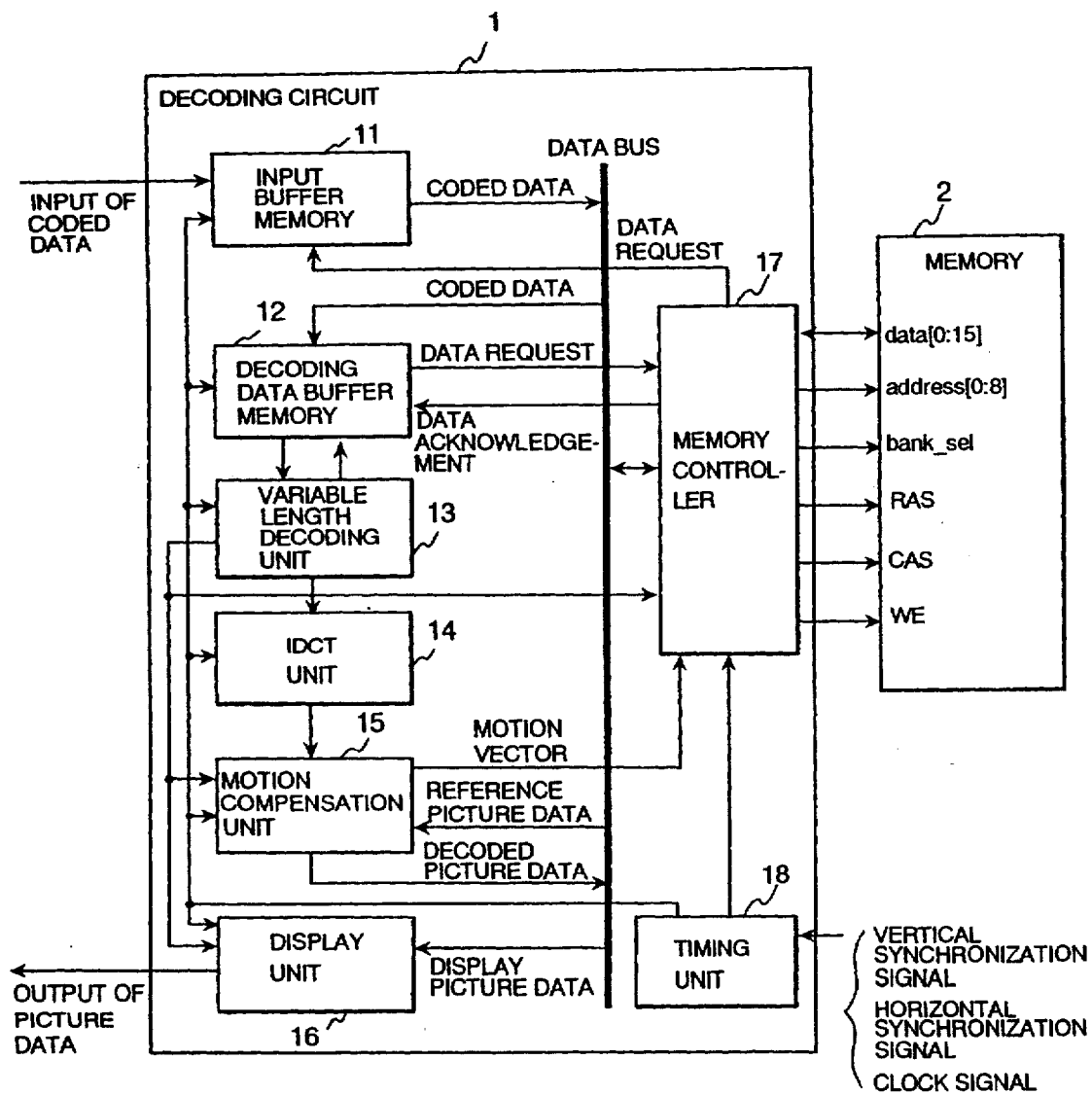
Figure 2:
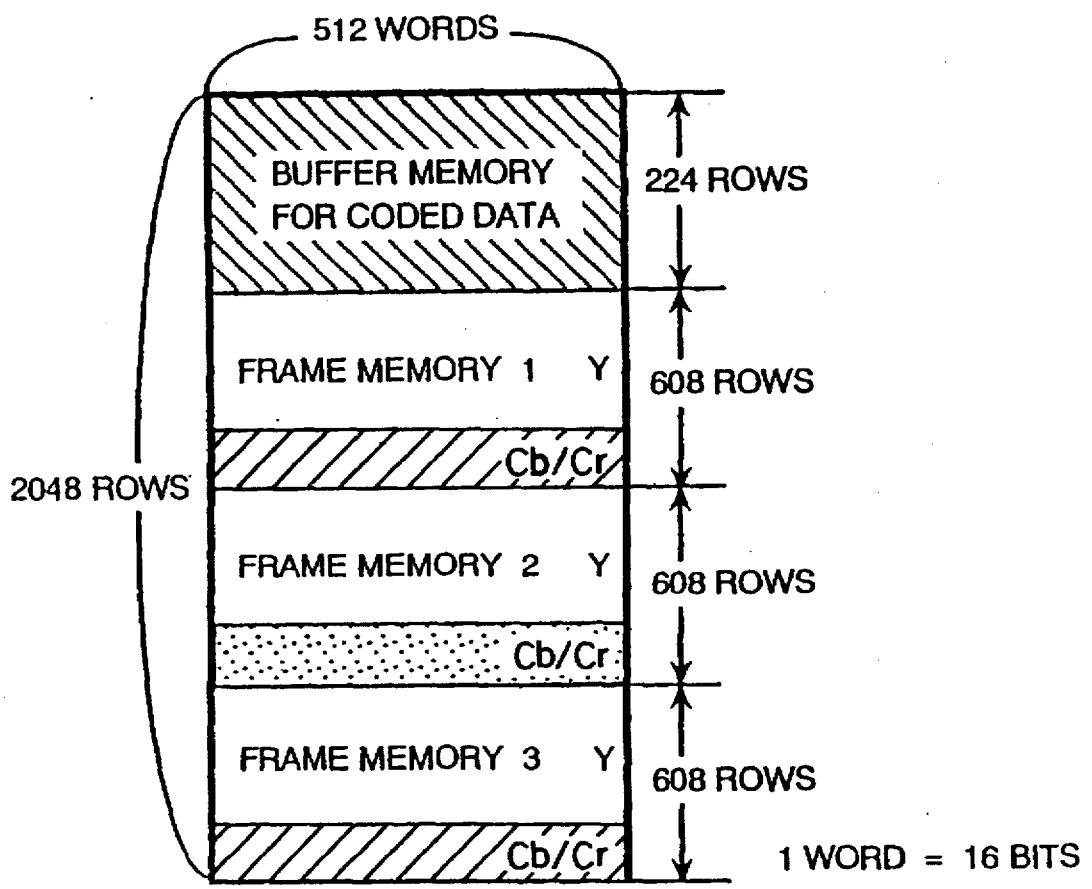
Figure 11:
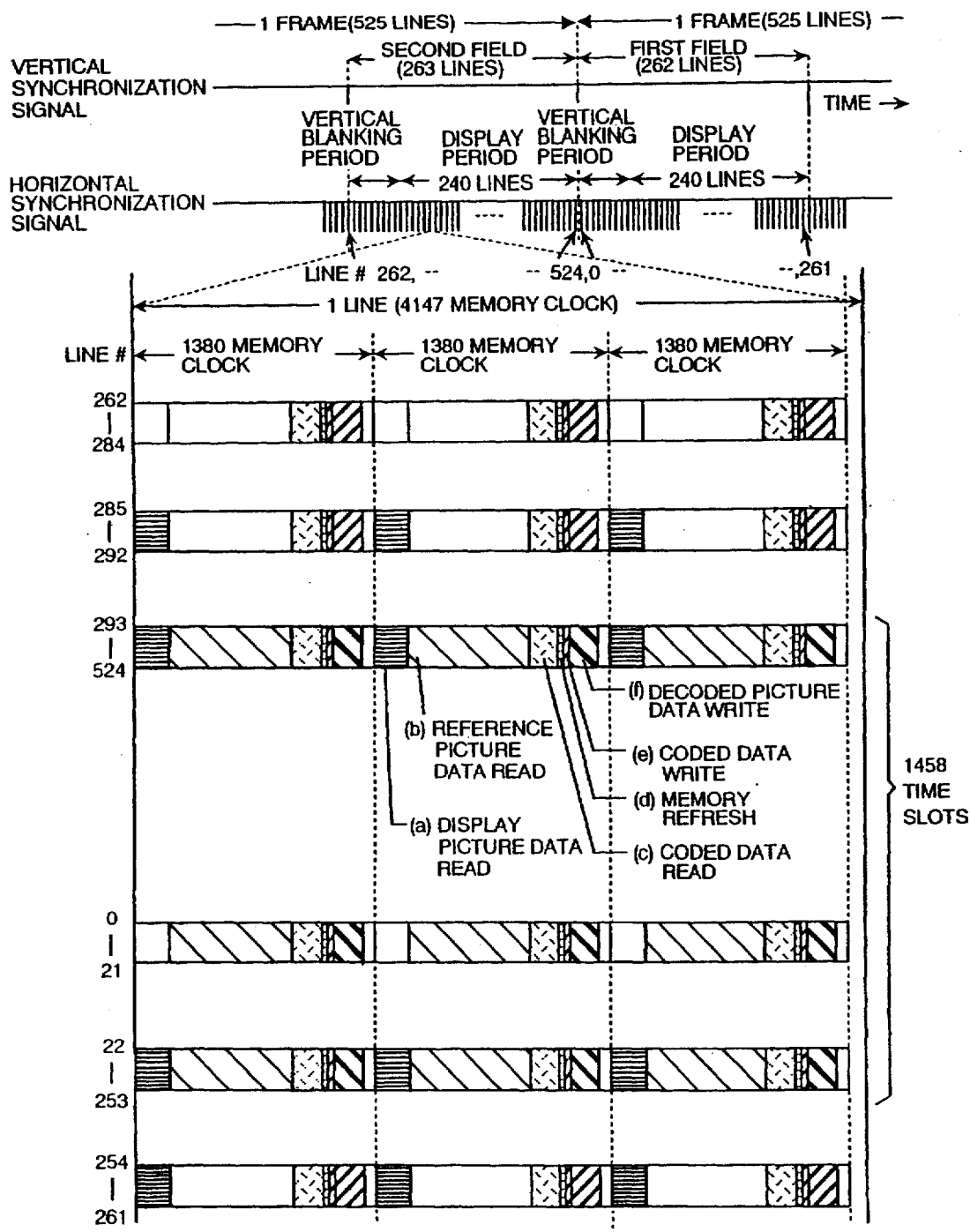
Figure 12:
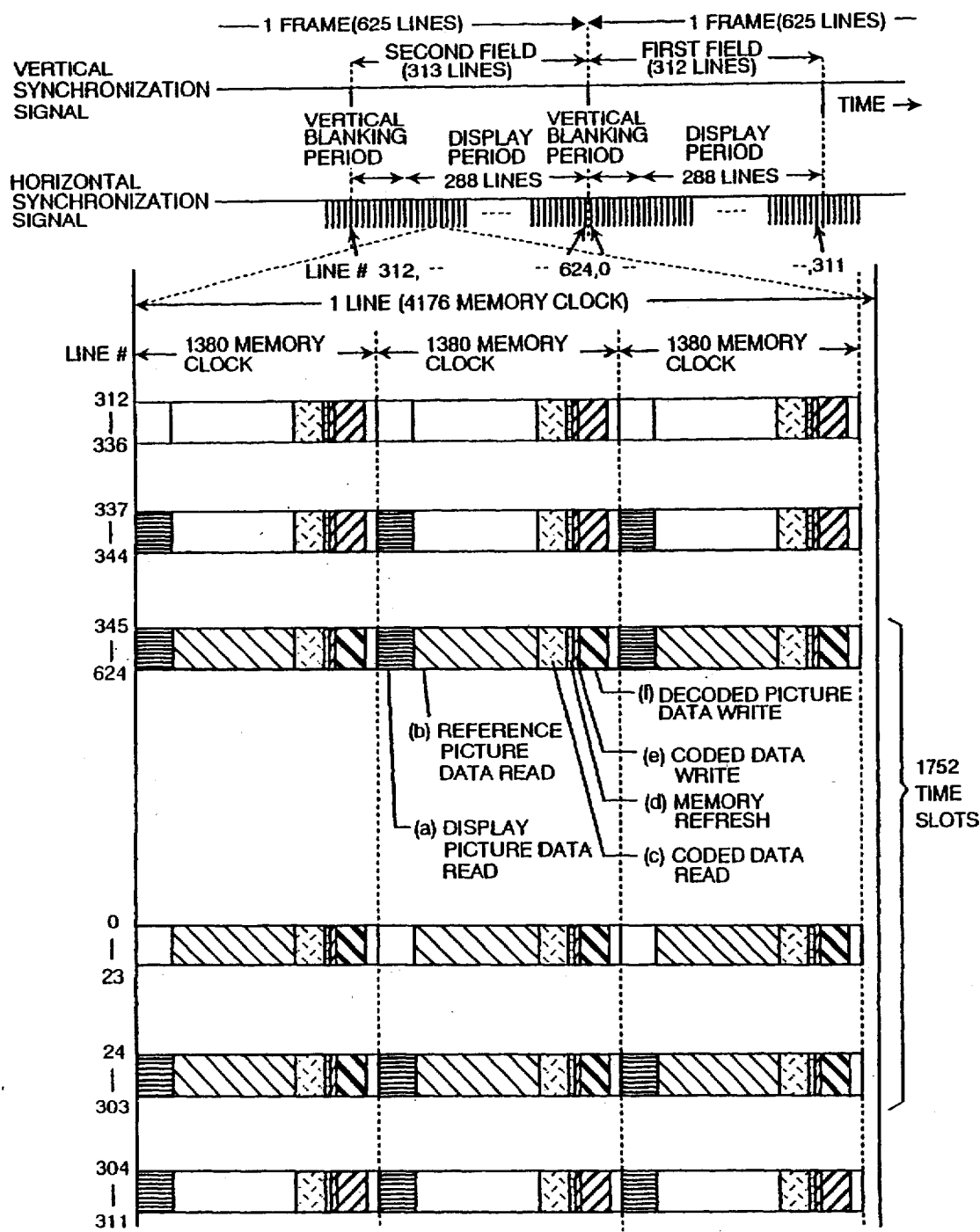
Figure 14:
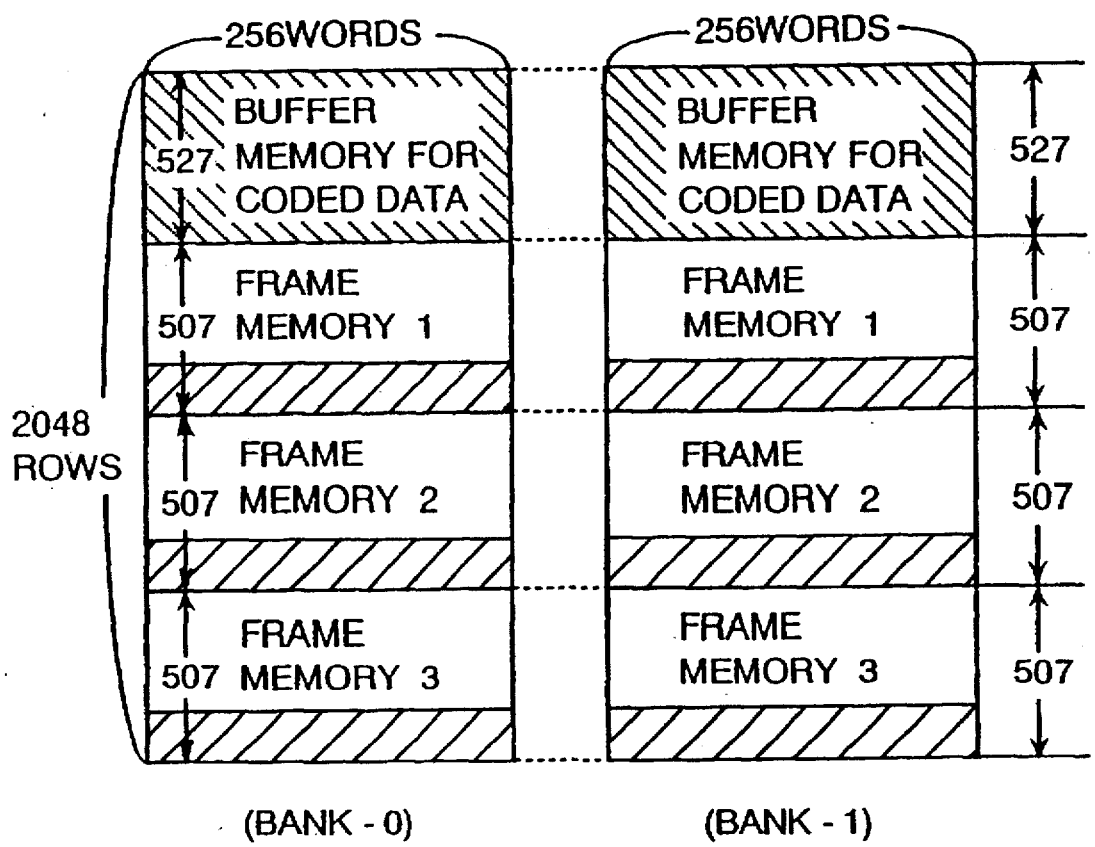
Figure 18:
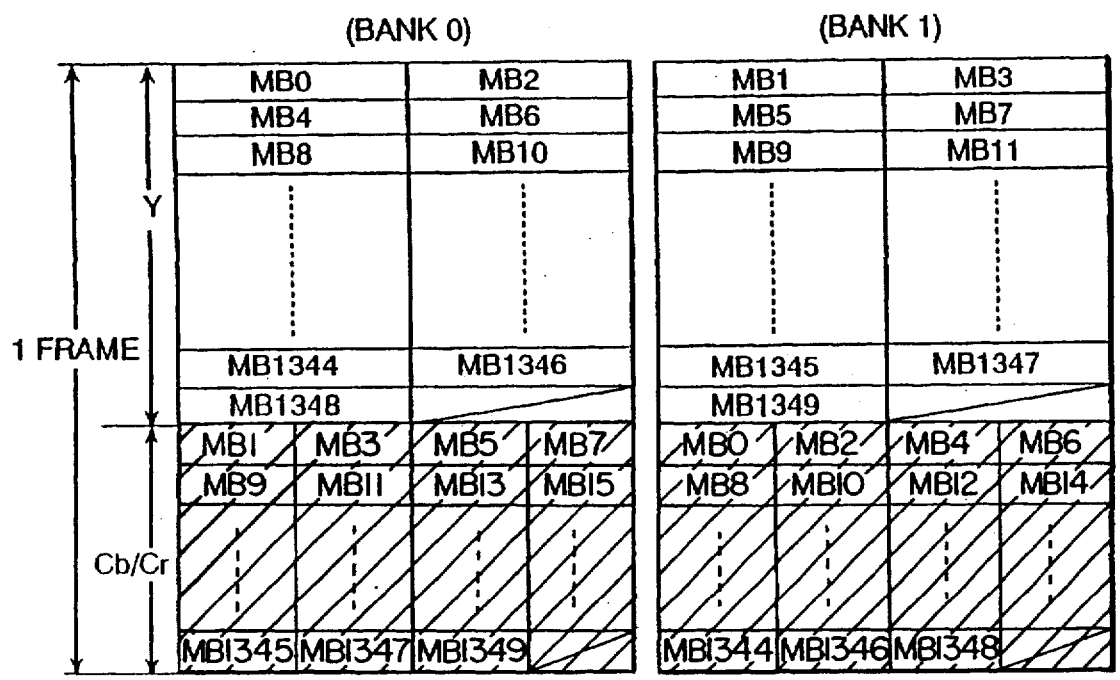
Figure 19:
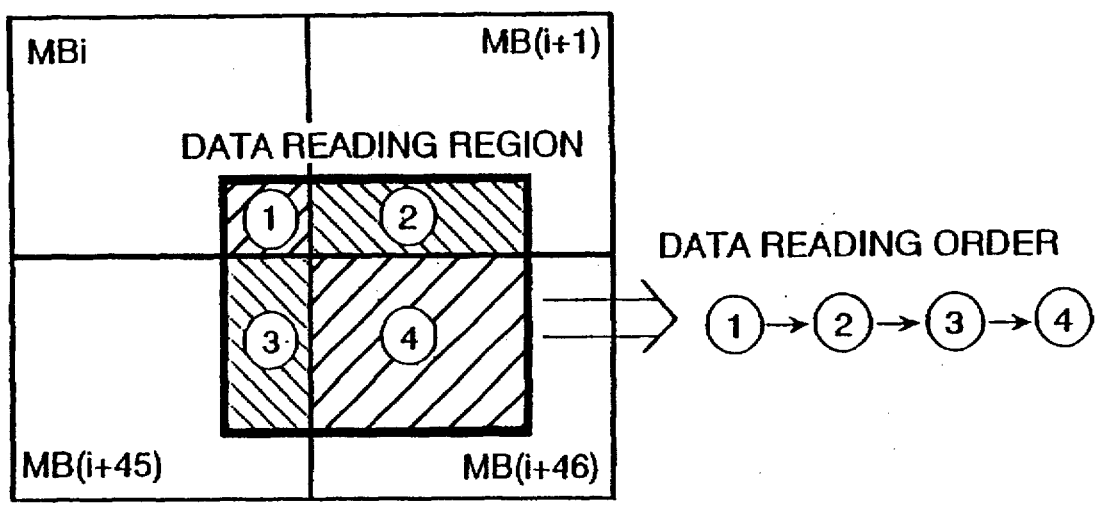

FIG. 19 is a drawing showing the existence position of the reference picture data to be read by (b) reference picture data read in correspondence with the macroblock. The range of reference picture data to be read generally extends over four macroblocks as shown in the drawing. In consideration of that the banks where the picture data of a luminance signal and the picture data of a chrominance signal are stored are different from each other for the respective macroblocks and the banks for the neighboring macroblocks are also different from each other, the banks can be accessed alternately. Namely, on the basis of the picture data mapping example shown in FIG. 18, whether the macroblock number on the upper left assigned with a number of i shown in FIG. 19 is odd or even is decided and the bank where the picture data of the luminance signal of the macroblock i is stored is checked. The picture data of the chrominance signal for the same macroblock is stored in a different bank from that of the luminance signal. For example, when i is even, the luminance signal of the macroblock i is stored in Bank 0 and the chrominance signal is stored in Bank 1. When picture data is read as reference picture data in the order of luminance signal of macroblock i→chrominance signal of macroblock i→chrominance signal of macroblock i+1→luminance signal of macroblock i+1→luminance signal of macroblock i+46→chrominance signal of macroblock i+46→chrominance signal of macroblock i+45→luminance signal of macroblock i+45 or in the order of luminance signal of macroblock i→luminance signal of macroblock i+1→luminance signal of macroblock i+46→luminance signal of macroblock i+45→chrominance signal of macroblock i+45→chrominance signal of macroblock i+46→chrominance signal of macroblock i+1→chrominance signal of macroblock i, it is possible to start access from Bank 0 and end access at Bank 1.

Furthermore even for (a) display picture data read, in consideration of that it is necessary to display the luminance signals and chrominance signals together, by accessing in the order of a luminance signal and then a chrominance signal for each even-numbered macroblock and in the order of a chrominance signal and then a luminance signal for each odd-numbered macroblock, it is possible to access Bank 0 and Bank 1 alternately.

In the aforementioned memory control system, as time slots for (a) display picture data read, (b) reference picture data read, (c) coded data read, (e) coded data write, and (f) decoded picture data write, fixed time slots are allocated regardless of the content of coded data. Each time slot accesses Bank 0 and Bank 1 alternately and a certain time slot may perform an access operation at the predetermined time regardless of the operation of the just prior time slot. By doing this, a function for arbitrating the data bus access right between the coded data write address generator unit 174, the coded data read address generator unit 175, the motion compensated reference picture data read address generator unit 176, the decoded picture data write address generator unit 177, and the display picture data read address generator unit 178 is not necessary and each circuit can be simplified substantially.

In the explanation of the embodiments of the present invention, a correspondence with coded data which is coded in frame units is used by combining intra-frame coding, inter-frame coding using motion compensation, and frame-interpolation coding.

However, for example, even in a case of coded data which is coded only by intra-frame coding, the present invention can be applied. Data may be coded not only in frame units but also in field units and even when the two coded data coexist, the present invention can be applied. Furthermore, as a coding system, instead of the system using DCT described in the embodiments, another system for processing in block units of the predetermined size, for example, a system using vector quantization may be used.

As to coded data inputted to an apparatus for picture decoding, not only a case that coded data is inputted continuously at a fixed bit rate but also a case that coded data is inputted at a variable bit rate or inputted at a burst may be considered. In either case, the present invention can be applied.

It is obvious that the present invention can be applied also to an apparatus for digital video signal decoding corresponding to HDTV which is different from the current TV in resolution. An apparatus for picture decoding for switching the processing according to a plurality of video signals of the current TV of the 525/60 system, the current TV of the 625/50 system, and HDTV may be used. Furthermore, the present invention can be applied also to an apparatus for picture decoding which can enable not only display output of interlace scanning but also display output of sequential scanning.

Also as to an apparatus for picture coding, when the apparatus for picture coding is structured so as to execute coding as well as decoding and display and output decoded picture data, the present invention can be applied to the picture decoding circuit included in the apparatus for picture coding.

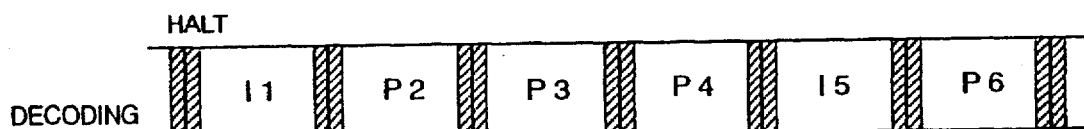

What is claimed is:

1. An apparatus for picture decoding comprising:
    decoding means for receiving coded data coded under at least one scanning system, and obtaining decoded picture data by decoding the received coded data of a video signal coded by a combination of at least one of intra-frame coding (I frame), inter-frame coding (P frame) referring to the previous frame, and frame-interpolation coding (B frame) referring to both of the previous frame and subsequent frame in frame units, each frame including two fields and block units which includes a plurality of pixels in the frame;
    memory means including a first frame memory, a second frame memory, and a third frame memory, each frame memory being for storing decoded picture data obtained by the decoding means;
    display means for reading the decoded picture data stored in the memory means in field units based on a display synchronization signal and obtaining interlace-scanned display picture data;
    time control means for reading the decoded picture data from the first frame memory and the second frame memory as reference frames for the B frame, and for controlling a time difference between a time of writing decoded picture data in the third frame memory, and a time of reading fields of decoded picture data from the third frame memory for display by the display means, in order to read decoded picture data before rewriting decoded picture data at a same address of the third frame memory;
    means for delaying a start of a display of fields of a frame of one of the I frame and the P frame, from a start of the decoding of coded data for the frame to be displayed, by at least 1.5 frames; and
    means for delaying a start of a display of fields of a frame of the third frame in the B frame, from a start of the decoding of coded data for the third frame in the B frame, by at least 0.5 frames.

2. An apparatus for picture decoding according to claim 1, wherein the at least one scanning system includes a scanning system of 30 Hz frame frequency and 525 scanning lines and a scanning system of 25 Hz frame frequency and 625 scanning lines; and
    wherein the memory means has a memory capacity of at most 16,777,216 bits and operates as a buffer memory by storing coded data before decoding it.

3. An apparatus for picture decoding according to claim 1, wherein the decoding means decodes two kinds of coded data including first coded data including the I frame, the P frame, and the B frame, and second coded data including the I frame and the P frame; and
    wherein the minimum delay time from a start of decoding of coded data of one frame to a start of display of its fields is 1.5 frames when the frame is coded by one of the I frame and the P frame in the first coded data, is 0.5 frames when the frame is coded by the B frame in the first coded data, and is 0.5 frames when the frame is coded by one of the I frame and the P frame in the second coded data.

4. An apparatus for picture decoding according to claim 1, wherein the decoding means decodes coded data of one frame within one frame period in synchronization with the display synchronization signal.

5. An apparatus for picture decoding according to claim 1, wherein the decoding means includes means for setting a decoding halt period at the time that the frame of coded data to be decoded is switched; and
    wherein the time control means includes
        means for starting writing of the decoded picture a specific time after starting of reading for the display which starts in the halt period, and
        means for ending writing of the decoded picture a specific time before ending of reading for the display which ends in the halt period.

6. An apparatus for picture decoding according to claim 1, wherein the time control means includes means for setting predetermined time slots in synchronization with the display synchronization signal for writing and reading of decoded picture data at least to and from the third frame memory.

7. An apparatus for picture decoding according to claim 6, wherein the time slots are set so that a plurality of block units can be decoded within one horizontal scanning period of the display synchronization signal.

8. An apparatus for picture decoding according to claim 7, wherein the at least one scanning system includes a scanning system of 30 Hz frame frequency and 525 scanning lines and a scanning system of 25 Hz frame frequency and 625 scanning lines; and wherein the time slots are set so that the number of block units which can be decoded during one horizontal scanning period of the display synchronization signal is the same for both scanning systems.

9. An apparatus for picture decoding according to claim 6, wherein the memory means further includes a buffer memory for temporarily storing the coded data;

wherein the time control means further includes
coded data write means,
coded data read means,
decoded picture data write means,
reference picture data read means for reading decoded picture data as reference picture data, and
display picture data read means; and
wherein the time slots are set in correspondence with access from each of the coded data write means, the coded data read means, the decoded picture data write means, the reference picture data read means, and the display picture data read means.

10. An apparatus for picture decoding comprising:

decoding means for obtaining decoded picture data by decoding coded data of a video signal coded by at least one of intra-frame coding (I frame), inter-frame coding (P frame) referring to the previous frame, and frame-interpolation coding (B frame) referring to both of the previous frame and subsequent frame in frame units, each frame including two fields and block units which includes a plurality of pixels in the frame;

memory means including a first frame memory, a second frame memory, and a third frame memory commonly connected to one data bus and one address bus, each frame memory being for storing decoded picture data obtained by the decoding means;

display means for reading the decoded picture data stored in the memory means in field units based on a display synchronization signal and obtaining interlace-scanned display picture data;

time control means for reading the decoded picture data from the first frame memory and the second frame memory as reference frames for the B frame, and for controlling a time difference between a time of writing decoded picture data in the third frame memory, and a time of reading decoded picture data from the third frame memory for display by the display means, in order to read decoded picture data before rewriting decoded picture data at a same address of the third frame memory;

means for delaying a start of a display of a frame of one of the I frame and the P frame, from a start of decoding of coded data for the frame to be displayed, by at least 1.5 frames; and means for delaying a start of a display of a frame of the third frame in the B frame, from a start of decoding of coded data for the third frame in the B frame, by at least 0.5 frames;

wherein the memory means further includes a first memory array and a second memory array, the first frame memory, the second frame memory, and the third frame memory being mapped in the first memory array and the second memory array;

wherein the time control means includes
decoded picture data write means for storing decoded picture data,
reference picture data read means for reading the decoded picture data as reference picture data, and
display picture data read means for obtaining interlace-scanned display picture data; and
wherein each of the decoded picture data write means, the reference picture data read means, and the display picture data read means supplies a memory control signal for preparation of the next read/write to the second memory array while the time control means is reading data from the first memory array or writing data in the first memory array, and supplies a memory control signal for preparation of the next read/write to the first memory array while the time control means is reading data from the second memory array or writing data in the second memory array.

11. An apparatus for picture decoding according to claim 10, wherein the memory means further includes a buffer memory for temporarily storing the coded data;

wherein the time control means further includes
coded data write means, and
coded data read means; and
wherein the coded data write means and the coded data read means supply a memory control signal to the second memory array while the time control means is reading data from the first memory array or writing data in the first memory array, and supply a memory control signal to the first memory array while the time control means is reading data from the second memory array or writing data in the second memory array, and write or read coded data in or from the memory means by pairing accesses to the first memory array and the second memory array.

12. An apparatus for picture decoding according to claim 11, wherein the decoded picture data write means, the reference picture data read means, the display picture data read means, the coded data write means, and the coded data read means supply a memory control signal to the first memory array during the operation period of the decoded picture data write means, the reference picture data read means, the display picture data read means, the coded data write means, or the coded read means which is reading or writing data from or in the memory means beforehand so as to start to read data from the first memory array or to write data in the first memory array.

13. An apparatus for picture decoding according to claim 11, wherein the decoded picture data write means, the reference picture data read means, the display picture data read means, the coded data write means, and the coded data read means read data from the memory means or write data in the memory means in correspondence with time slots set in synchronization with the display synchronization signal.

14. An apparatus for picture decoding according to claim 10, wherein the decoded picture data write means, the reference picture data read means, and the display picture data read means supply a memory control signal to the first memory array during the operation period of the decoded picture data write means, the reference picture data read means, or the display picture data read means which is reading or writing data from or in the memory means beforehand so as to start to read data from the first memory array or to write data in the first memory array.

15. An apparatus for picture decoding according to claim 10, wherein the decoded picture data write means, the reference picture data read means, and the display picture data read means read data from the memory means or write data in the memory means in correspondence with time slots set in synchronization with the display synchronization signal.

16. An apparatus for picture decoding according to claim 10, wherein the memory means further includes buffer means; and wherein the time control means further includes
- means for storing control commands in the buffer means, and
- means for reading the control commands from the buffer means for controlling the simultaneous read/write of the first memory array and the second memory array.

* * * * *

UNITED STATES PATENT AND TRADEMARK OFFICE
CERTIFICATE OF CORRECTION

PATENT NO. : 5,880,786
DATED : March 9, 1999
INVENTOR(S) : Oku et al.

It is certified that error appears in the above-identified patent and that said Letters Patent is hereby corrected as shown below:

Replace the drawing figure on the title page of the patent with Fig. 1 as shown on the attached sheets.

Replace Figs. 1-2, 8, 10-12, 14, and 18-19 of the patent with Figs. 1-2, 8(a)-8(e), 10(a)-10(c), 11-12, 14, and 18-19 as shown on the attached sheets.

Signed and Sealed this

Eighteenth Day of December, 2001

Attest:

*Attesting Officer*

JAMES E. ROGAN
*Director of the United States Patent and Trademark Office*